US006661906B1

(12) United States Patent
Kawade et al.

(10) Patent No.: US 6,661,906 B1
(45) Date of Patent: Dec. 9, 2003

(54) IMAGE CREATING APPARATUS

(75) Inventors: Masato Kawade, Kyoto (JP); Hirohide Ushida, Kyoto (JP); Naohiro Tabata, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 08/993,627

(22) Filed: Dec. 18, 1997

(30) Foreign Application Priority Data

| Dec. 19, 1996 | (JP) | ............................................. 8-339246 |
| Dec. 25, 1996 | (JP) | ............................................. 8-345423 |
| Dec. 25, 1996 | (JP) | ............................................. 8-345424 |
| Dec. 25, 1996 | (JP) | ............................................. 8-345426 |

(51) Int. Cl.[7] ................................................. G06K 9/00
(52) U.S. Cl. ........................ 382/118; 382/170; 382/190; 382/305; 345/629
(58) Field of Search ................................. 382/115, 118, 382/117, 162, 164, 165, 167, 190, 170, 305; 345/326, 141, 435, 433, 192, 619, 629

(56) References Cited

U.S. PATENT DOCUMENTS

| 4,308,553 | A | * | 12/1981 | Roetling ..................... 358/507 |
| 5,057,019 | A | * | 10/1991 | Harvey ....................... 434/155 |
| 5,450,504 | A | | 9/1995 | Calia |
| 5,557,688 | A | * | 9/1996 | Makamura .................. 382/164 |
| 5,563,992 | A | * | 10/1996 | Murata et al. ............... 345/433 |
| 5,586,238 | A | * | 12/1996 | Murata ........................ 345/326 |
| 5,600,767 | A | * | 2/1997 | Kakiyama et al. .......... 345/435 |
| 5,638,502 | A | * | 6/1997 | Murata ........................ 345/433 |
| 5,644,690 | A | * | 7/1997 | Yoshino et al. ............. 354/435 |
| 5,850,470 | A | * | 12/1998 | Kung et al. ................. 382/155 |
| 6,091,844 | A | * | 7/2000 | Fujii et al. ................... 382/165 |

FOREIGN PATENT DOCUMENTS

| EP | 0584759 | 3/1994 |
| EP | 0603790 | 6/1994 |
| EP | 0704822 | 4/1996 |

OTHER PUBLICATIONS

Li, Yuanzhong et al., "Extraction of Facial Sketch images and Expression Transformation Based on Facs" Proceedings of the International Conference on Image Processing (ICIP) IEEE Comp. Soc. Press, 9/95, pp. 520–523.
Kouzani, A.Z., et al., "Constructing a Fuzzy Grammar for Syntactic Face Detection," IEEE International Conference on Systems, Man and Cybernetics, IEEE 6/96, pp. 1156–1161.

* cited by examiner

*Primary Examiner*—Jayanti K. Patel
*Assistant Examiner*—Sheela Chawan
(74) *Attorney, Agent, or Firm*—Dickstein Shapiro Morin & Oshinsky LLP

(57) ABSTRACT

An image creating apparatus for creating plural kinds of images which are different in each image class about brushwork and expression based on data of a single image, which includes a face component library (11) and a rule library (12). The face component library (11) is composed of image libraries (11*a* to 11*g*) of the respective face components such as eyes, noses, mouths and so forth each of which stores a plurality of image groups of the respective face components having different image elements in each of image classes "i=1 to n". An eye image library 11*a* stores an image group composed by a plurality of eye images having different image elements about slant and roundness for each image class. The image elements are an item for measurement about character quantities extracted from the entered image data. In the same manner, the rule library (12) is composed of a select rule library (12*a*), a deform rule library (12*b*) and an arrange rule library (12*c*) which store rule groups consisting of a plurality of rules for each face component about each image class (i=1 to n).

17 Claims, 21 Drawing Sheets

| SLANT RULE | |
|---|---|
| $\theta \leq \theta_1$ | LEFT DOWNWARD |
| $\theta_1 < \theta < \theta_2$ | ORDINARY |
| $\theta \geq \theta_2$ | RIGHT DOWNWARD |

| ROUNDNESS RULE | |
|---|---|
| $y/x \leq a$ | NARROW |
| $a < y/x < b$ | ORDINARY |
| $y/x \geq b$ | ROUND |

| ROUNDNESS \ SLANT | LEFT DOWNWARD | ORDINARY | RIGHT DOWNWARD |
|---|---|---|---|
| NARROW | | | |
| ORDINARY | | | |
| ROUND | | | |

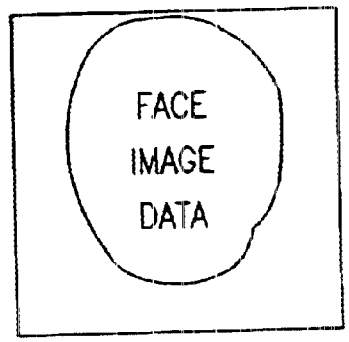
FIG. 6A
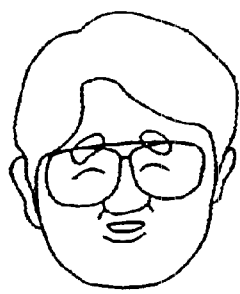     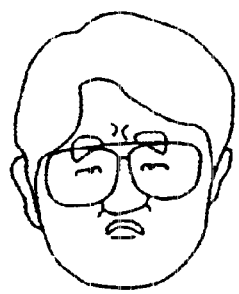     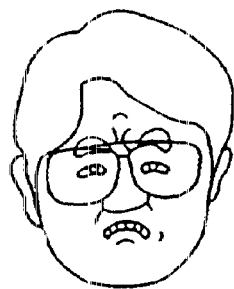
FIG. 6B         FIG. 6C         FIG. 6D

| EYE | | 
|---|---|
| HIGH | ◯ |
| ORDINARY | ◎ |
| THIN | ⊙ |
| MOUTH | |
|---|---|
| LONG | ‿ |
| ORDINARY | ‿ |
| SHORT | ‿ |
FIG. 8A
| EYE | FEMALE | MALE |
|---|---|---|
| ROUND | ◎ | ◯ |
| ORDINARY | ◎ | |
| NARROW | ◎ | |
| MOUTH | |
|---|---|
| LONG | ᴗᴗ |
| ORDINARY | ᴗᴗ |
| SHORT | ᴗᴗ |
FIG. 8B
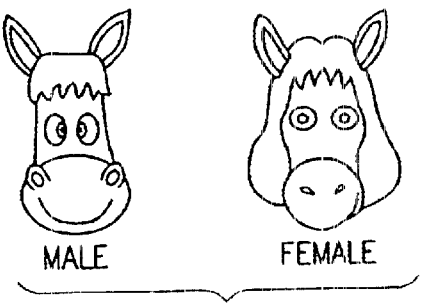
MALE　　FEMALE
FIG. 8C
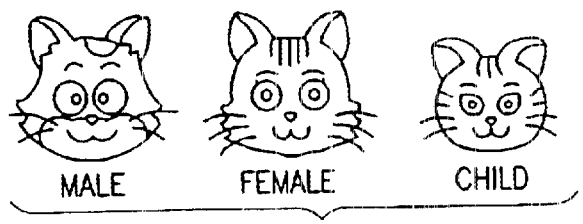
MALE　　FEMALE　　CHILD
FIG. 8D

IMAGE CREATING APPARATUS

BACKGROUND OF THE INVENTION

1. Field of the Invention

This invention relates to an image creating apparatus for creating an image in accordance with preselected classifications upon entry of data, and more particularly to an improved apparatus suitable for creating an image relating to a face of a person.

2. Discussion of the Related Art

A portrait is conventionally used in in mass media such as newspapers, magazines and so forth, computers such as displays documents in word processors.

Drawing a portrait precisely expressing features of a face of a person is difficult because the drawer is required to have a good observation power of extracting a character of the face and a good representation power for exaggerating and reproducing the character. Accordingly, there is expected the development of an apparatus for automatically creating a portrait upon entry of an optional image.

There has been proposed heretofore a technique for extracting character quantities of face components such as eyes, a nose, a mouth, eyebrows and ears in the entered image of a face, and choosing or deforming face components previously stored based on the extracted character quantities to be arranged to make a portrait. This technique may be applied to creation of an image which is composed of a single or a plurality of image components other than portraits.

In this technique for automatically making an image such as a portrait, a single form is employed to chose or deform an image component based on a character quantity of an image component extracted from an entered image, so that portraits cannot be made in plural different kinds of forms based on an entered single face image which are different styles or facial cannot be made about the same person.

SUMMARY OF THE INVENTION

It is, therefore, a primary object of this invention to provide an improved image creating apparatus in which image component data is selected by a character quantity of an image component extracted from entered single image data and a selected-and-entered class to create an image, so that plural kinds of images having different styles and expressions may be created based on the entered single image data.

It is another object of this invention to provide an improved image creating apparatus which extracts a character quantity of a plurality of face components including color of at least one component from entered color face image data and corrects a standard color of at least one face component image to create a portrait with bright color based on the entered color face image data.

It is still another object of this invention to provide an improved image creating apparatus which may express a composite image in three dimensions without increasing the number of images, whereby reproduction of portraits created based on the entered face image data is improved.

According to a first aspect of this invention, there is provided an image creating apparatus which includes an image input device for receiving input of image data, a storage advice storing a plurality of image component data each having a different character quantity in each of a plurality of image character quantity, a class select device for receiving a selection-input for one of the plurality of image classes, and a control device for selecting image component data from the storage device based on a character quantity of an image component extracted from the image data received by the image input device and the image class selected by the class select device to create an image. The image component data includes a select rule of image component data. The image data input device includes an image pickup device for taking an image. The storage device stores component data about a face so as to create a portrait based on face image data entered by the image input device. The plurality of image classes are classified by types, expressions, ages and sexes.

In this image creating apparatus, an image or a portrait based on entered image data or face image data is created by image component data corresponding to a selected image class, so that plural kinds of images or portraits having different styles and expressions may be created based on the entered single image data or face image data. The image component is selected by the select rule so that it may be finely selected according to each image class.

According to a second aspect of this invention, there is provided an image creating apparatus according to the first aspect of this invention wherein the control device creates a plurality of image and which includes an image display device for displaying the plurality of images created by the image display device, and an output device for producing an image selected by the image select device.

This apparatus displays a plurality of images based on the plurality of image classes having different trends in character quantities of a singe image data and selectively generates one of the displayed plural images. Accordingly, after confirming an image creating status for the plurality of images having different classes, an operator may selectively generate his or her favorite image from the plurality of According to a third aspect of this invention there is provided an image creating apparatus according to the second aspect of this invention in which the control device creates a first image and a single or a plurality of second images by selecting image component data from the storage device based on the character quantity of the image component extracted from the image data entered by the image data, an image class selected by the class select device and a single or a plurality of image classes not selected by the class select device, the image display device displays the second imaqes in a standby process in each of the devices or in a process of the first image, and the image select device receives a selection whether or not the second images are produced.

This apparatus creates an image based on the selected image class and an image based on non-selected image class to be displayed in the standby process or in the process of an image according to the selected image class for selective output. The image based on non-selected image class is also selectively outputted to improve its operation efficiency.

According to a fourth aspect of this invention, there is provided an image creating apparatus according to the first aspect of this invention in which the input device receives color image data, the storage device stores component image data of a plurality of components including standard color data of at least one image component, and the control device extracts a character quantity of a plurality of components including color of the at least one component from color image data entered by the image input device, reads out component image data from the storage device based on the extracted character quantity, and corrects a standard color of a corresponding component based on the extracted color to create an image. The control device extracts colors of a plurality of portions in at least one component of the entered color image data, and decides whether or not other component is selected as a result of comparison among the colors of the plurality of portions. For instance, when a center of a cheek different from normal is added into a cheek of the portrait.

This image creating apparatus extracts a character quantity of a plurality of face components including color of at least one component from entered color face image data and corrects a standard color of at least one face component image so that a portrait with bright color may be created based on the entered color face image data.

According to a fifth aspect of this invention, there is provided an image creating apparatus which includes a storage device for storing images of a plurality of components included in a single composite image with distance data from a view point to the respective images, images of a plurality of small components which are divided about one or all of the components according to a distance from the view point with distance data from a view point to the respective images for each component, and an image composite device for executing an process for each pixel to select an image having the shortest distance from the view point in the images of a plurality of components or small components extracted from the storage device. The view point represents a view point of a person who watches the portrait. An image of a component placed in an area in a distance direction from the view point to the images of other component other small component in the plurality of components is divided into images of a plurality component or the other small components. The composite image and an image of hair is divided into images of small components placed in front and back of the face image.

This image creating apparatus can express a composite image in three dimensions without increasing the number of images, whereby reproduction of portraits created based on the entered face image data is ensured.

BRIEF DESCRIPTION OF THE DRAWINGS

Other objectives and advantages of this invention will be more readily apparent from the following detailed description provided in conjunction with the following figures, of which:

FIG. 6 shows a creating status of a portrait to select an image class, "laugh", "cry" or "anger";

FIG. 8 shows storage in the face component library and the rule library and a creating status of a portrait when animals may be selected as image classes in the image creating apparatus;

DETAILED DESCRIPTION OF THE INVENTION

Figure 1:
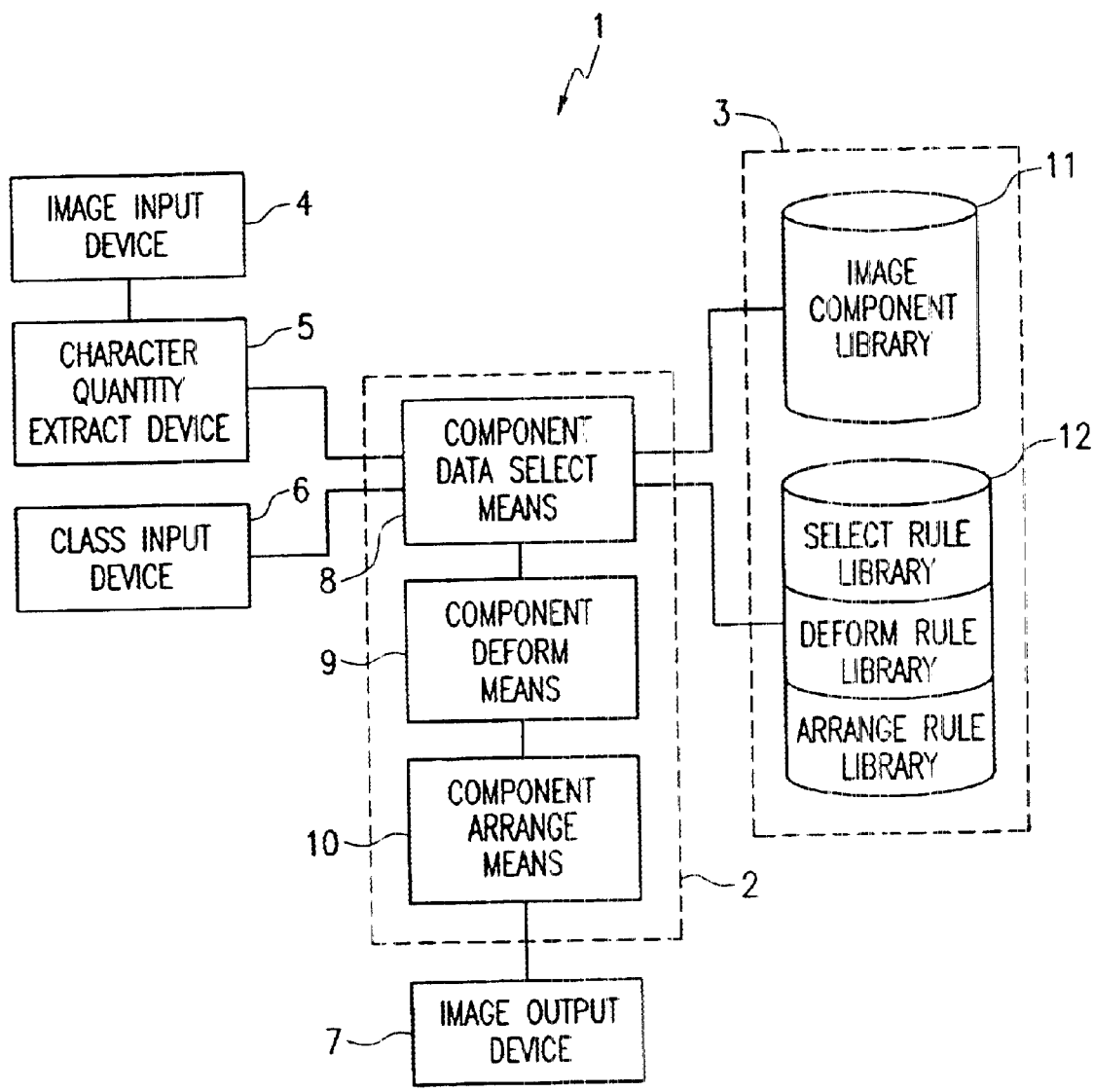
FIG. 1 is a schematic block diagram of an image creating apparatus as a first embodiment of this invention.

Referring, now, to FIG. 1, there is shown a schematic block diagram of an image creating apparatus 1 as a first embodiment of this invention, which creates a portrait specifying one of a plurality of image classes such as brushwork, expressions and so forth based on a character quantity of a face component extracted from entered face image data. The face components includes eyes, noses, mouths, eyebrows, ears and hair. The brushwork means trends of exaggeration and deformation in respectively uniformed face components, and is different for each painter. The same painter makes different styles such as a comics character style, a handsome man style, a beautiful woman style, and a real style. The expression represents a status of a face expressing feelings.

The image creating apparatus 1 includes a control device 2 for creating a portrait by selecting, deforming and arranging each face component as an image component, a storage device 3 for storing a plurality of face component data therein, an image input device 4 such as a video camera for receiving image data, a character quantity extract device 5 for extracting a character quantity of a face component included in the received image data, a class input device 6 for receiving a selection-input for an image class such as brushwork, expression and so forth, and an image output device 7 such as a printer for outputting the created image.

The control device 2 controls the image input device 4, the character quantity extract device 5, the class input device 6 and the image output device 7. The device 2 includes a component data select means 9 for reading out a select rule, a deform rule and an arrange rule from the storage device 3 to further read out a face component from the storage device 3 according to the read out select rule, a component deform means 9 for deforming the face component according to the read Out deform rule, and a component arrange means 10 for arranging the face component according to the arrange rule after the deformation.

The storage device 3 stores face component data including arranging a face component. The device 3 includes a face image component library 11 storing a plurality o images about the respective face components which are classified for each image class, and a rule library 12 storing each rule group classified into each image class to be used for selecting, deforming and arranging a face component.

Figure 2:
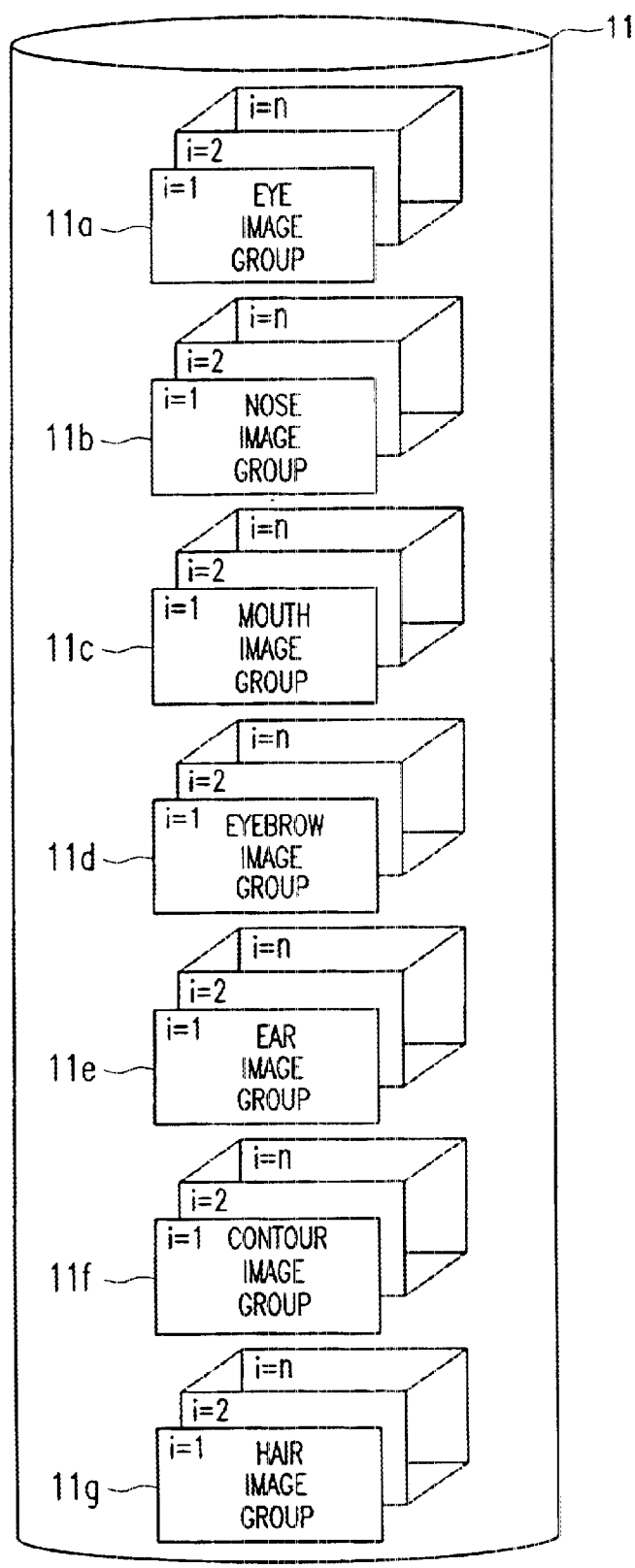
FIG. 2 represents stored data in a face image component library of a storage device employed in the image creating apparatus.

As shown in FIG. 2, the face component library 11 is composed of a plurality of image libraries 11a through 11g for the respective face components of eyes, noses, mouths, eyebrows, ears, contours and hair. Each image library corresponding to each face component stores a plurality of image groups classified to image classes "i=1 to n" in each of which image elements are different. For instance, the eye image library 11a stores an image group composed of a plurality of eye images each having different image elements about gradient and roundness for each image class. The image elements are an item for measuring a character quantity extracted from the entered image data.

Figure 3:
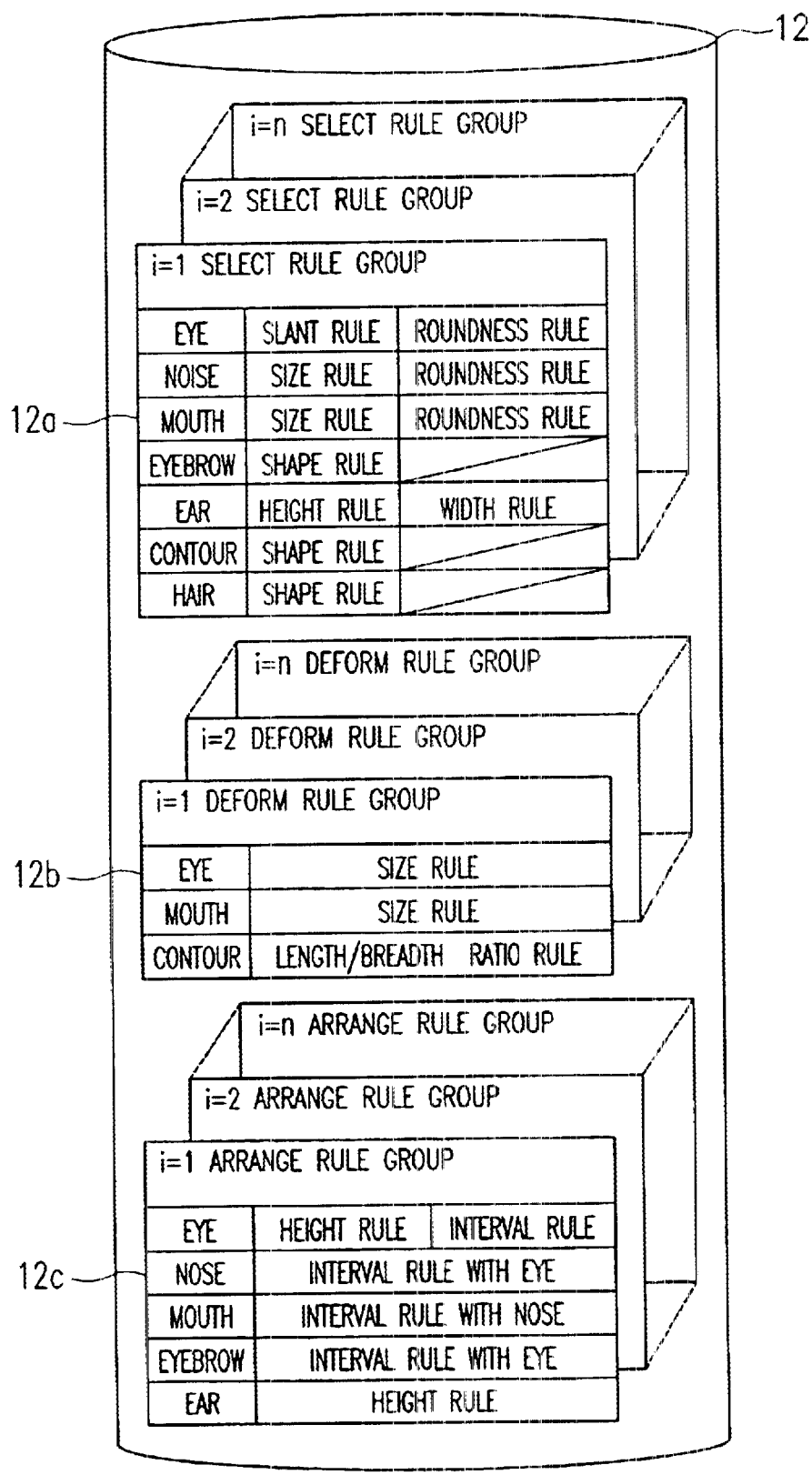
FIG. 3 represents stored data in a rule library of a storage device employed in the image creating apparatus.

As shown in FIG. 3, the rule library 12 includes a select rule library 12a, a deform rule library 12b and an arrange rule library 12c, each of which stores a rule group consisting of a plurality of rules about each of image classes "i=1 to n" for each face component. For instance, the select rule library 12a includes a select rule group for each image class. rule and a roundness rule about an eye to specify each image in the respective image libraries 11a to 11g of the face component library 11.

Each rule may be represented by membership functions and fuzzy rules of fuzzy reasoning. For instance, in a membership function, an area including a measurement result of a character quantity about each image element is represented by a label of an antecedent of a fuzzy rule, and each image is represented by a consequent output of the fuzzy rule. Each rule may be composed by a table.

Figure 4:
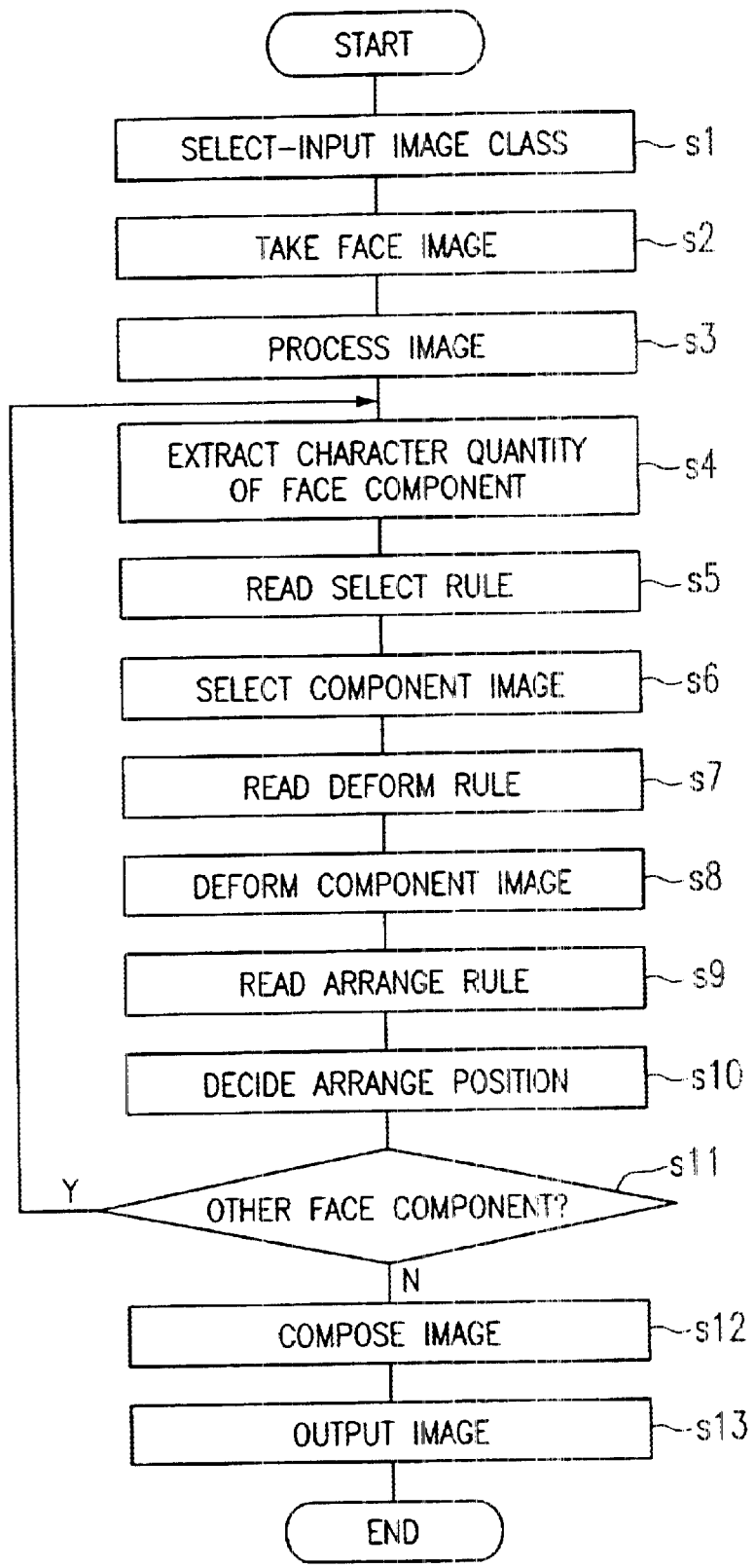
FIG. 4 is a flow chart for creating an image in the image creating apparatus.

The image input device 4 is composed of a video camera for taking an image of a face of a person, but may be represented by a scanner for reading a picture of a face. The character quantity extract device 5 image-processes face image data entered by the image input device 4 and extracts a character quantity of a face component after specifying a position of the face component in the processed face image data. For instance, measured values of slants roundness (a ratio of length and breadth) and size about an eye are extracted as a character quantity of a face component. The class input device 6 is represented by a keyboard or a mouse to receive selection-input of an image class such as brushwork, expression, age, sex and so forth. The image output device 7 is a printer outputting a composite image on FIG. 4 is a flow chart for creating an image in the image creating apparatus 1 of this embodiment. The control device 2 receives a selection-input for an image class by the class input device 6 (a step s1), and the image input device 4 takes a face image upon the entry of the selection of the image class (a step s2). The control device 2 applies a predetermined image process to the face image data taken by the image input device 4 (a step s3), and specifies a face component in the face image data after processing the face image to extract the character quantity (a step s4).

Then, the control device 2 reads a select rule for selection of the face component image from the select rule library 12a of the storage device 3 based on the entered image class (a step s5), and selects a face component image from one of image libraries in the image component library 11 (a step S6). Moreover, a deform rule for deforming the face component image is read out from the deform rule library 12b based on entered image class (a step s7), the face component image is deformed based on the read out deform rule and the extracted character quantity (a step s8), an arrange rule for an arrange position of the face component image is read out from the arrange rule library 12c based on the entered image class (a is decided based on the read out arrange rule and the extracted character quantity (a step 610).

The control device 2 executes the process from the step s4 to the step s10 about each face component (a step s11). After the decision of the selection, the deformation and the arrange position of the face component image is finished about all face components, the selected and deformed face component image is arranged at the decided arrange position to compose a face image (a step s12) and the composite face image is generated through the image output device 7 (a step s13).

The control device 2 may be represented by a microcomputer, and the storage device 3 may be represented by a hard disk drive. The processing contents by the control device 2 and the storage contents of the storage device 3 may be supplied from the external through a storage media.

Figures 5A, 5B, 5C:
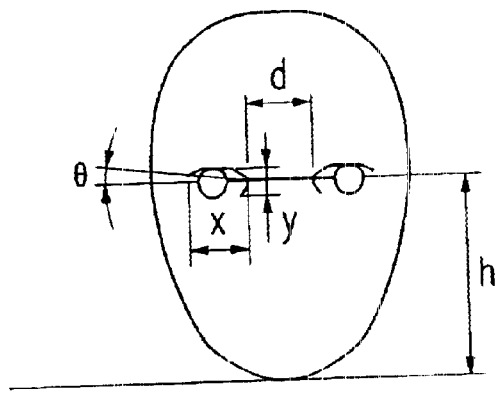
FIG. 5 illustrates a process for selecting, deforming and arranging face component images in the image creating apparatus.
Figure 7A:
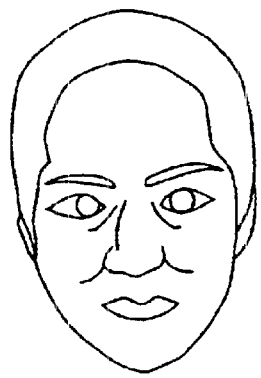
FIG. 7 shows a creating status of a portrait for each image class about the same person when brushwork by painters and style difference by the same painter may be selected as image classes in the image creating apparatus.
Figure 7B:
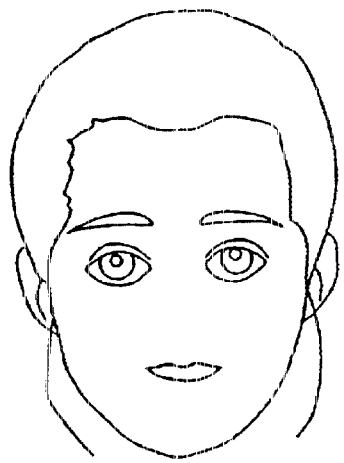
Figure 7C:
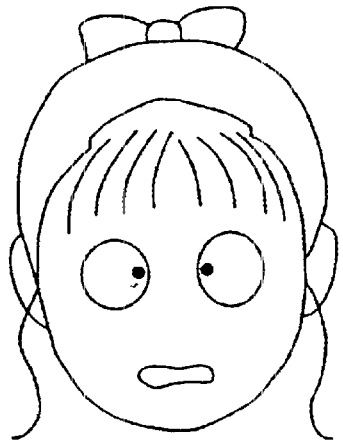
Figure 7D:
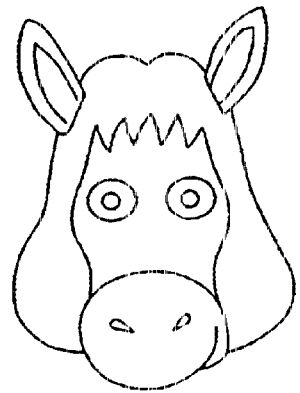
Figure 7E:
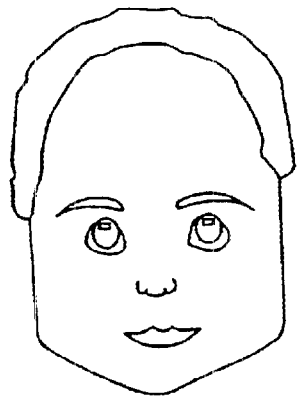

FIG. 5 illustrates a process for selecting, deforming and arranging a face component image in the image creating apparatus 1. When the selection, the deformation and the determination of an arrange position is processed by the process from the step s4 to the step s10 about an eye image as a face component, an eye is specified in the image data applied by a predetermined image process, and an angle "θ" between a center line of eyes and a horizontal line, a width "x" of the eye, a height "y", a spacing "d", and a distance "h" from the center line of the eyes to a chin are measured as shown in FIG. 5 at (A).

Then, a select rule group to be used based on a previously selected "i" is read out, the values of angle "θ" and "x/y" are respectively applied to a slant rule of the eye and a roundness rule of the eye included in the select rule group to determine a label of a range including the measured values about the slant and the roundness of the eye as shown in FIG. 5 at (B). By using the label determined about the slant and roundness of the eyes, an image of the corresponding eyes is chosen from image group of eyes in the image class selected in the eye component library 11a as shown in FIG. 5 at (C).

Then, a deform rule group to be used is read out based on the class "i" selected beforehand, a size rule of eyes included in the deform rule group is applied by the width "x" of the eye and the height "y" of the eyes to determine a dilatation ratio and a contraction ratio of the eye image. An arrange rule group to be used is read out based on the class "i" selected beforehand, an arrange rule of eyes included in the arrange rule group is applied by the spacing "d" of the eyes and the distance "h" from the center line of eyes to the chin to determine an arrange position of the eyes within a contour of the face.

A same operation as the foregoing operation is executed about other face components to determine selections, deformations and arrange positions about all of the face components. The deformation, however, are executed only about face contours, eyes and a mouth but not executed about other race components. Eyes and mouth may be included into a selection process by storing different size images in the face component library 11.

Thus, images of face components and rules about selection, deformation and arrangement of face components are stored for each image class, selection-input for a desired image class is received, an image of a face component corresponding to the selected image class is selected, deformed and arranged by the rule corresponding to the image input to create a portrait by the selected image class. For instance, when the image classes are selectable from "laugh", "cry" and "anger" and an image data shown in FIG. 6 at (A) is entered, portraits shown in FIG. 6 at (B) to (D) are created according to selection in the image classes.

When the image classes are selectable according to differences of brushwork for each painter and styles by the same painter and a face image data shown in FIG. 7 at (A) is entered, a portrait is selectively created from a beautiful woman style portrait by a painter A as shown in FIG. 7 at (B), a comics character style portrait by the painter A as shown in FIG. 7 at (C), an animal style portrait by the painter A as shown in FIG. at (D) and a real style portrait by a painter B as shown in FIG. 7 at (E). Thus, plural kinds of portraits having different brushwork are selectable created about the same person, and the same person may repeatedly create a portrait by selecting other brushwork than the formerly made brushwork, so that a frequency of use and an operation efficiency in the image creating apparatus is improved.

When images replaced by animals such as a horse and a cat are stored in the face component library 11 and rules for selecting, deforming and arranging an image corresponding to a character quantity extracted frown image data are stored in the rule library 12 for each animal as shown in FIG. 8 at (A) and (B), a composite portrait composed by the selected animal may be created as shown in FIG. 6 at (C) and (D).

When images different by an age and a sex as image classes are stored in the face component library 11 and rules for selecting, deforming and arranging an image corresponding to a character quantity extracted from image data are stored in the rule library for each age and sex, a portrait corresponding to an age and a sex entered as image classes may be created.

Figure 9:
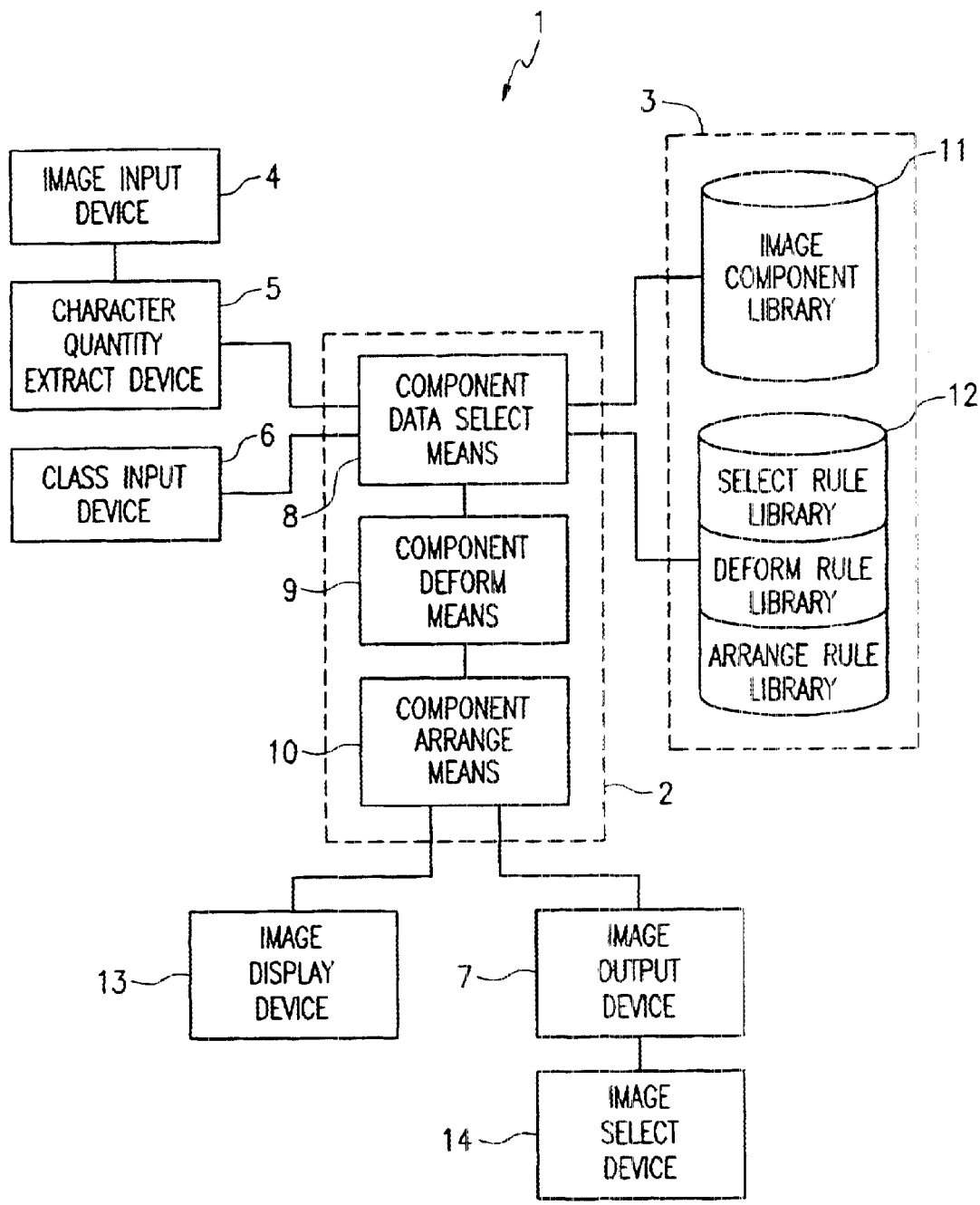
FIG. 9 is a schematic block diagram of an image creating apparatus as a second embodiment of this invention.
Figure 10:
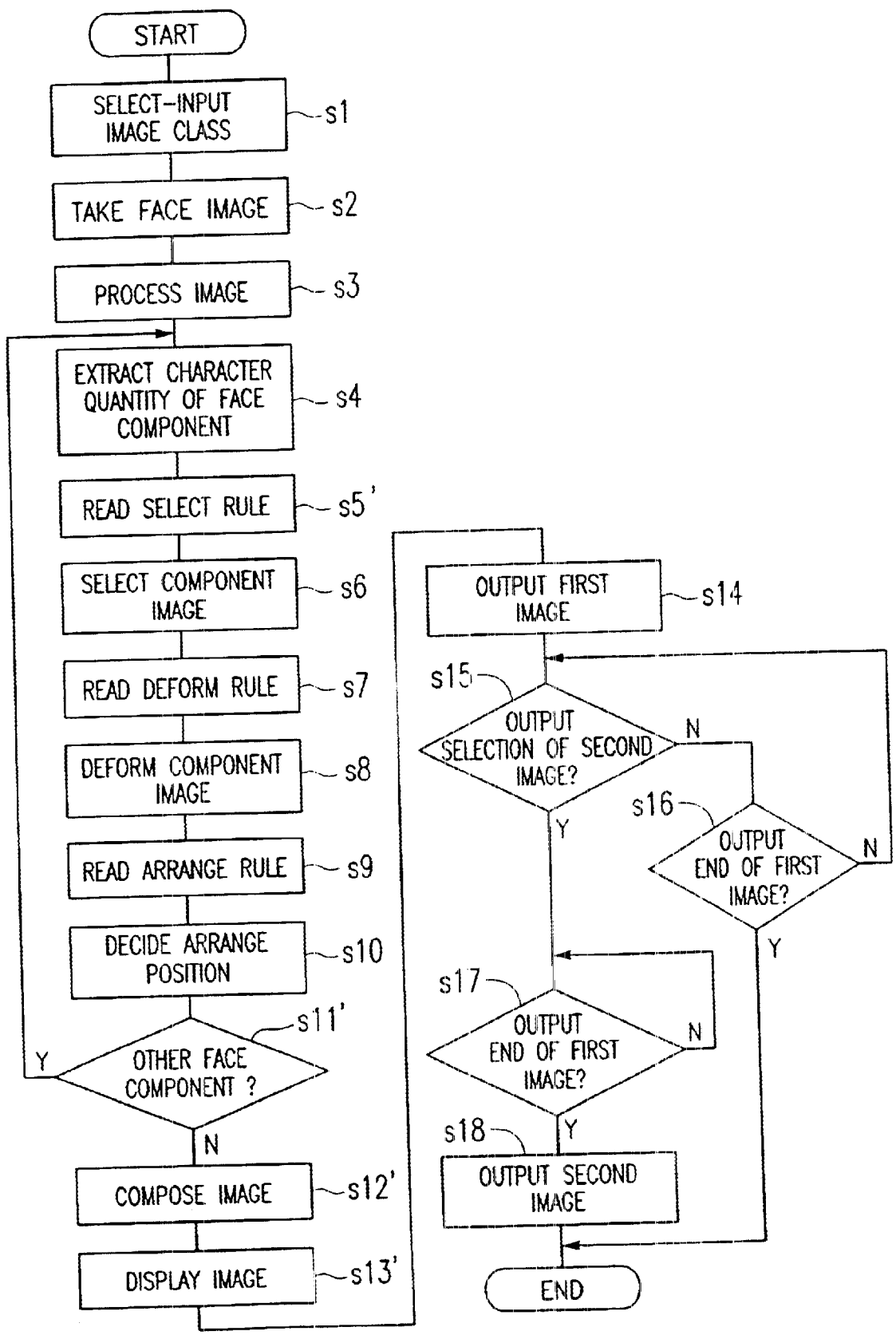
FIG. 10 is a flow chart for creating an image in the image creating apparatus of FIG. 9.

In FIG. 9 there is shown a schematic block diagram of an image creating apparatus as a second embodiment of this invention. The same components corresponding to those in the fist embodiment are given the same reference numerals and this embodiment is provided with a later-described image display device 13 and a later-described image select device 14. In FIG. 10, there is shown a flow chart for creating n image in the image creating apparatus of FIG. 9, wherein the same steps corresponding to those of FIG. 4 are given the same reference numerals and the steps executing processes similar to those of FIG. 4 are given the same reference numerals marked with dash markings.

The control device 2 receives a selection-input for an image class by the class input device 6 (a step s1), and the image input device 4 takes a face image upon the entry of the selection of the image class (a step s2). The control device 2 applies a predetermined image process to the face image data taken by the image input device 4 (a step s3), and specifies a face component in the face image data after processing the face image to extract the character quantity (a step s4).

Then, the control device 2 regards entered image class as a first image class and note-entered image class as a second image class, and reads a select rule for selection of the face component image from the select rule library 12a of the storage device 3 based on the first and second image classes (a step s5'), and selects a race component image from one of image libraries in tho image component library 11 based on the read out select rule and the extracted character quantity (a step S6).

The second image class is determined from a plurality of image classes stored beforehand under a single condition in which the second image class is a different image class from the first image class select-entered through the class input device 6. For instance, an image class whose predetermined priority is the second rank of the first image class may be selected.

Moreover, a deform rule for deforming the face component image is read out from the deform rule library 12b based on entered image class (a step s7), the face component image is deformed based on the read out deform rule and the extracted character quantity (a step s8), an arrange rule for an arrange position of the face component image is read out from the arrange rule library 12c based on the entered image class (a step s9), and an arrange position for the face component image is decided based on the read Out arrange rule and the extracted character quantity (a step s10).

The control device 2 executes the process from the step s4 to the step s10 about each face component for the first and the second image classes (a step s11'). After decision of the selection, the deformation and the arrange position of the face component image is finished about all face components for deformed face component image is arranged at the decided arrange position to compose a first face image of the first image class and a second image class of the second image class (a step s12') and the composited first and second images are displayed by the image display device 13 (a step s13').

Then, the control device 2 actuates the image output device 7 to output the first face image (a step s14), and receives a selection-input whether or not the second face image is outputted in an output process of the first image (steps s15 and s16). If the output of the second face image is selected by manipulating the image select device 14 in an output processing of the first image, the image output device 7 generates the second image following to the completion of an output process of the first face image (steps s17 and s18).

The control device 2 is represented by a microcomputer, and the storage device 3 is represented by a hard disk driver. The processing contents by the control device 2 and the storage of the storage device 3 may be supplied from the external.

An example of creating a portrait is omitted herein because it is described above in conjunction with FIGS. 5 and 6.

Figure 11:
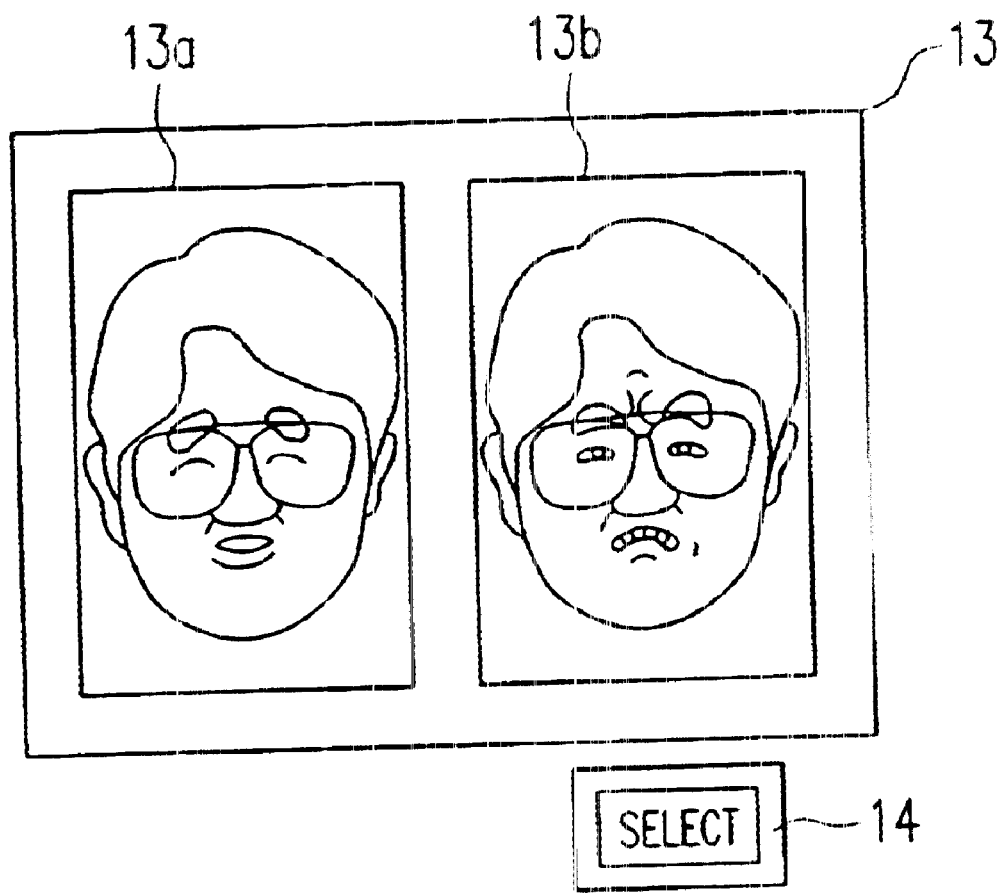
FIG. 11 is a display status of a portrait made by the image creating apparatus of FIG. 9.

As shown in FIG. 11, the image display device 13 represented by a display such as CRT, LCD or the like is composed of a pair of image display areas 13a and 13b. When "laugh" is chosen as an expression class in the step s1 of FIG. 10, a portrait 13a having an expression of "laugh" is displayed in one image display area 13a of the image display device 13 as a first face image. Simultaneously, a face image in the not-selected class, for instance, a portrait having an expression "anger" is displayed in other image display area 13b of the image display device 13 as a second face image. If the image select device 14 which is a key disposed on an operational panel is manipulated during the time when the image output device 7 outputs the portrait 13a having the expression "laugh", the portrait having the expression "anger" is outputted.

Figure 12:
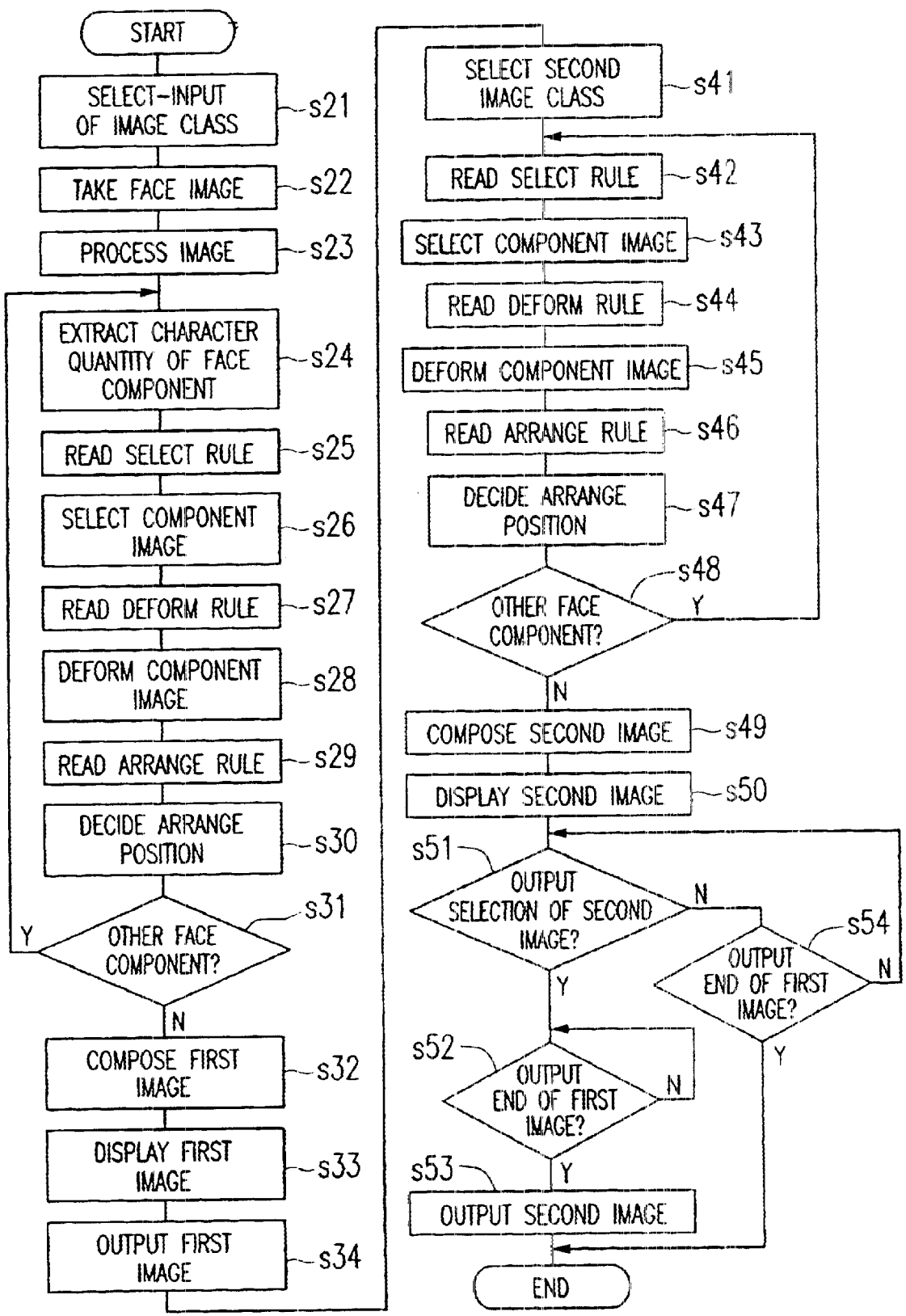
FIG. 12 is a flow chart of creating an image by an image creating apparatus as a modification of the second embodiment of this invention.

In FIG. 12, there is shown a modification of the sequence of FIG. 10, in which the second face image is created in the second image class during an output process of the first face image in the first image class (steps s41 to s53) and it is inquired if the second face image is outputted (step s51). Accordingly, it is possible to store a character quantity of a face component extracted when a face image in the first image class is created and to create an face image in the second image class. If the output of the second face image is not chosen when the second face image is displayed for a predetermined time period, the sequence from step s51 to s54 is repeated and still another face image is created to be displayed based on other image class than the first and second image classes, so that plural kinds of portraits with different brushwork sand expressions are outputted.

Figure 13A:
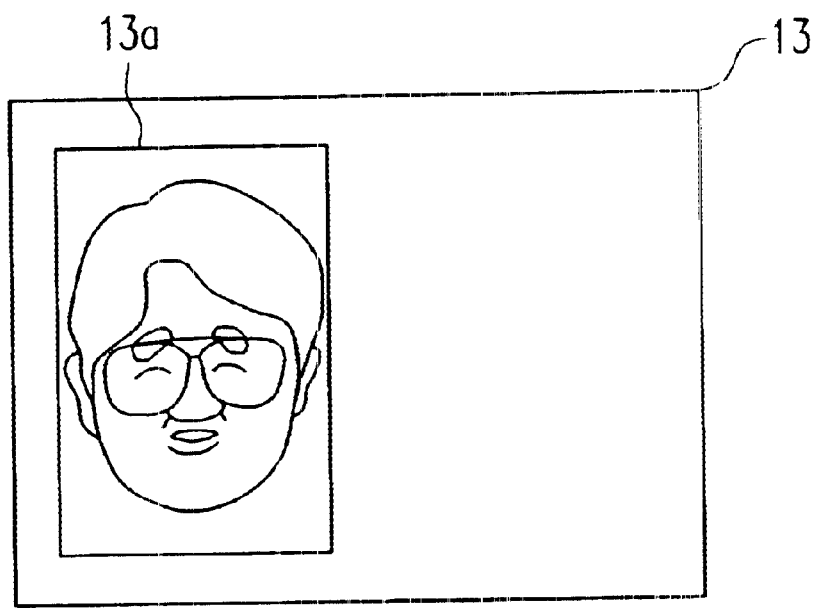
FIG. 13 is a display status of a portrait made by the image creating apparatus of FIG. 12.
Figure 13B:
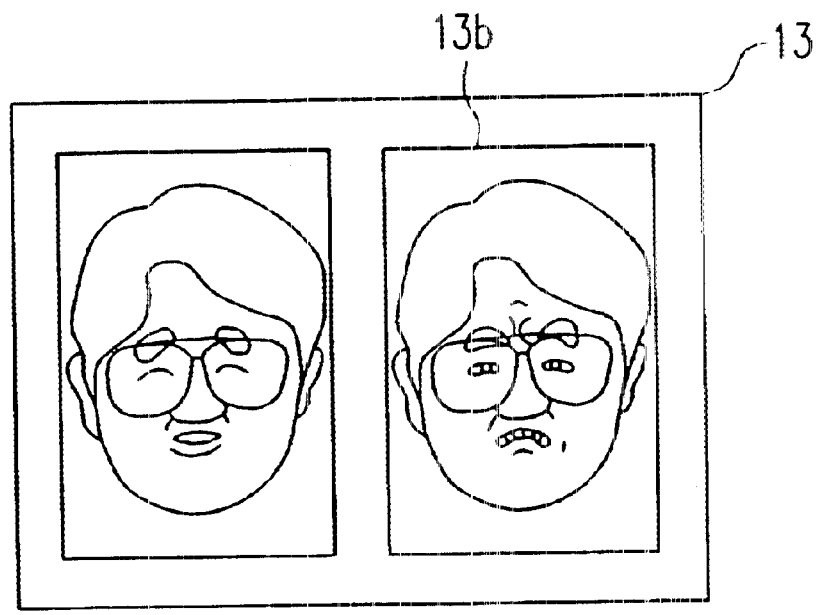

When "laugh" is chosen as an expression class in the step s1 of FIG. 10, a portrait having an expression of "laugh" device 13 as shown in FIG. 13 at (A). Then, during a time when the portrait to "laugh" is outputted, a face image in a non-chosen image class, for instance, a portrait having an expression of "anger" is created as a second face image to be displayed in other image display area 13b of the image display device 13 as shown in FIG. 13 at (B).

When images replaced by animals such as a horse and a cat are stored in the face component library 11 and rules for selecting, deforming and arranging an image corresponding to a character quantity extracted from image data are stored in the rule library 12 for each animal as shown in FIG. at (A) and (B), a composite portrait composed by the selected animal may be created as shown in FIG. 8 at (C) and (D).

When images different by an age and a sex as image classes are stored in the face component library 11 and rules for selecting, deforming and arranging an image corresponding to a character quantity extracted from image data are stored in the rule library 12 for each age and sex, a portrait corresponding to an age and a sex entered as image classes may be created.

In addition, if output of the portrait wants to be charged, a condition for throwing money may be included in the selection process of the image classes (step s1 and a21) and the selection process of output of the second image (steps a15 an s51).

Figure 14:
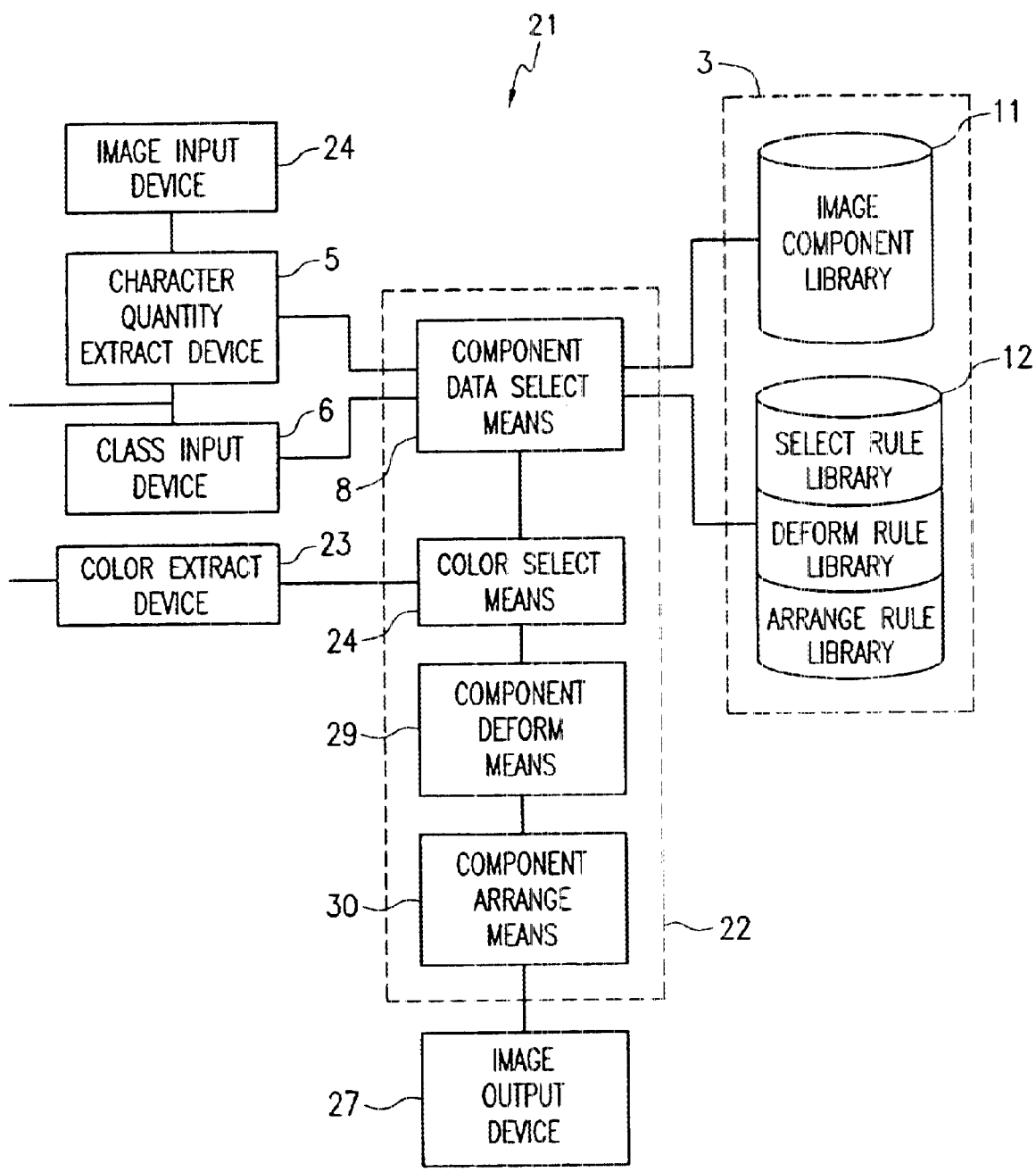
FIG. 14 is a schematic block diagram of an image creating apparatus as a third embodiment of this invention.

FIG. 14 is a schematic block diagram of an image creating apparatus 21 as a third embodiment of this invention, and the same components as those in the foregoing embodiments are given the same reference numbers.

The image creating apparatus 21 creates a color portrait specifying brushwork, expression and so forth based on a character quantity of a face component extracted from entered color face image data. The face components are eyes, noses, mouths, eyebrows, ears and hair. The brushwork means trends of exaggeration and deformation in respectively uniformed face components, and is different for each painter. The same painter makes different styles such as a comics character style, a handsome man style, a beautiful woman style, and a real style. The expressions represent a status of a face expressing feelings.

The image creating apparatus 21 includes a control device 22 for creating a portrait by selecting, deforming and arranging each face component as an image component, a storage device 3 for storing a plurality of face component data therein, an image input device 24 such as a video camera for receiving color image data, a character quantity extract device 5 for extracting a character quantity of a face component included in the received image data, a color extract device 23 for extracting color of hair and a cheek in the image data, a class input device 6 for receiving a selection-input for an image class such as brushwork, expression and so forth, and an image output device 27 such as a printer for outputting the created color image.

The control device 22 controls the image input device 24, the character quantity extract device 5, a color extract device 23, the class input device 6, and the image output device 7. The device 22 includes a component data select means 8 to read out from the storage device 3 a select rule, a deform rule and an arrange rule which correspond to the entered image class and to further read out a face component from the storage device 3 according to the read out select rule and the character quantity extracted from the character extract device 5, a color correct means 24 for correcting a standard color of face contours and hair in the face components read out by the component data select means 8 based on a color extracted by the color extract device 23, a component deform means 29 for deforming the face component according to the read out deform rule, and a component arrange means 30 for arranging the face component according to the arrange rule after the deformation.

The storage device 3 stores face component data including face component images and rules for selecting, deforming and arranging images of face components. The storage device 3 includes a face image component library 11 storing a plurality of images about the respective face components which are classified for each image class, and a rule library 12 storing each rule group classified into each image class to be used for selecting, deforming and arranging a face component.

The face component library 11 is composed of a plurality of image libraries 11a through 11g for the respective face components of eyes, noses, mouths, eyebrows, ears, contours and hair as shown in FIG. 2. Each image library corresponding to each face component stores a plurality of image groups classified to image classes "i=1 to n" in each of which image elements are different. For instance, the eye image library 11a stores an image group composed of a plurality of eye images each having different image elements about gradient and roundness for each image class. The face contour image library 11f and the hair image library 11g are composed of a plurality of images of face contours and hair which are respectively different about a shape of a. face representing a character quantity of face contours and a shape of hair representing a character quantity of hair, and each image is applied by a predetermined standard color. This standard color is a bright color corresponding to each image class, which is different from a color of a real face. For instance, in an image class of a comics character style, reddish pink may be a standard color in a face contour image, and yellow also may be a standard color in a hair image.

As shown in FIG. 3, the rule library 12 includes a select rule library 12a, a deform rule library 12b and an arrange rule library 12c, each of which stores a rule group consisting of a plurality of rules about each of image classes "i=1 to n" for each face component. For instance, the select rule library 12a includes a select rule group for each image class. One select rule group consists of select rules such as a slant rule and a roundness rule about an eye to specify each image in the respective image libraries 11a to 11g of the face component library 11 (see FIG. 5 at (B)).

Each rule may be represented by membership functions and fuzzy rules of fuzzy reasoning. For instance, in a membership function, an area including a measurement result of a character quantity about each image element is represented by a label of an antecedent of a fuzzy rule, and each image is represented by a consequent output of the fuzzy rule (see FIG. at (C)). Each rule may be composed by a table.

The image input device 24 is composed of a video camera for taking an image of a face of a person, but may be represented by a scanner for reading a picture of a face. The character quantity extract device 5 image processes face image data entered by the image input device 24 and extracts a character quantity of a face component after specifying a position of the face component in the processed face image data. For instance, measured values of slant, roundness (a ratio of length and breadth) and size about a eye are extracted as a character quantity of a face component. The to receive a selection-input of an image class such as brushwork, expression, age, sex an so forth. The image output device 27 is a printer outputting a composite image on paper.

Figure 15:
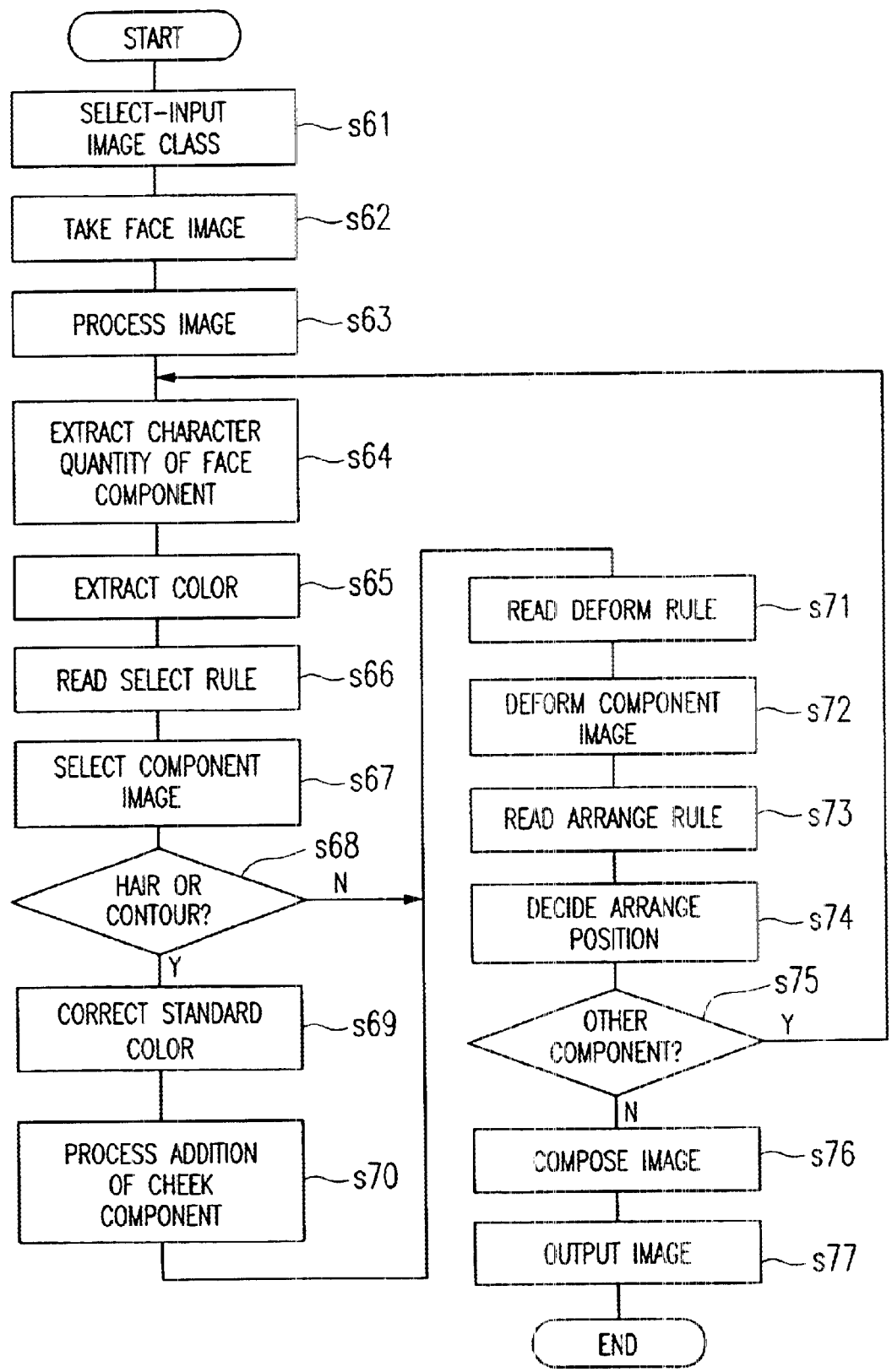
FIG. 15 is a flow chart for creating an image in the image creating apparatus of FIG. 14.

FIG. 15 is a flow chart for creating an image in the image creating apparatus 21 of this embodiment. The control device 22 receives a selection-input for an image class by the class input device 6 (a step s61), and the image input device 24 takes a color face image upon the entry of the selection of the image class (a step s62). The control device 22 applies a predetermined image process to the color face image data taken by the image input device 4 (a step s63), and specifies a face component in the face image data after processing the face image to extract the character quantity (a step s64). Moreover, the control device 22 extracts color of hair and face contours in the color face image data by a color extract s64 and the extracting process in the step s65 will be described later in detail.

Then, the control device 22 reads a select rule for selection of the face component image from the select rule library 12a of the Storage device 3 based on the entered image class (a step s66), and selects a face component image from one of image libraries in the image component library 11 (a step S67). As described above, the images of hair and face contours in the face component images selected from the image library are applied by a predetermined standard color. The control device 22 corrects the standard color about the images of hair and face contours by the color correct means 24 based on the average values of the respective colors of RGB in a top area of a head and in a large area of a cheek entered by the color extract device 23 (steps s68 and s69). Next, the control device 22 judges if a cheek component should be added to a portrait based on an average value of an R color in a large area of the cheek and an average vale of an R color in a small area of the cheek entered by the color extract device 23 (step s70). A correct process of the standard color in the step s69 and the addition process of the cheek component will be described in detail later.

Moreover, the control device 22 reads out a deform rule for deforming the face component image from the deform rule library 12b based on entered image class (a step s71), deforms the face component image based on the read out deform rule and the determined character quantity (a step s72), reads out an arrange rule for an arrange position of the face component image from the arrange rule library 12c based on the entered image class (a step s73) and decides an arrange position for the face component image based on the read out arrange rule and the determined character quantity (a step 574).

The control device 2 executes the process from the step s64 to the step s74 about each face component but only about the hair and face contours (a step s75). After the decision of the selection, the deformation and the arrange position of the face component image is finished about all face components, the selected and deformed face component image is arranged at the decided arrange position to compose a face image (a step s76) and the composite face image is generated through the image output device 27 (a step s77).

The control device 22 may be represented by a microcomputer, and the storage device 3 may be represented by a hard disk drive. The processing contents by the control device 22 and the storage contents of the storage device 3 may be supplied from the external through a storage media.

In the character extracting process of the step s64, for instance, when a character quantity about an eye image is determined as a face component, the character quantity extract device 5 specifies eyes in the face image data to measure an angle "$\theta$" between a center line of eyes and a horizontal line, a width "x" of the eye, a height "y", a spacing "d", and a distance "h" from the center line of the eyes to a chin as shown in FIG. 5 at (A). The character extract device 5 applies the measured character quantity "$\theta$" and "y/X" to the component data select means B. The component data select means 8 reads out a select rule group to be used based on a class i selected and entered beforehand and applies the values of angle "$\theta$" and "x/y" to a slant rule of the eye and a roundness rule of the eye included in the select rule group to determine a label of a range including the measured values about the slant and the roundness of the eye as shown in FIG. 5 at (i). By using the label determined about the slant and roundness of the eyes, an image of the corresponding eyes is chosen from image group of eyes in the image class selected in the eye component library ha as shown in FIG. 5 at (C).

Then, the component deform means 29 reads out a deform rule group to be used is read out based on the class i selected beforehand, a size rule of eyes included in the deform rule group is applied by the width "x" of the eye and the height "y" of the eye to determine a dilatation ratio and a contraction ratio of the eye image. The component arrange means 30 reads out an arrange rule group to be used is read out based on the class "i" selected beforehand, applies the character quantities "d" and "h" to the read Out arrange rule group to determine an arrange position of the eyes within contours of the face.

Same process as described above is executed about other face components to decide the selection, deformation and arrange position, wherein the deformation is executed only about the face contours, eyes and mouth, not other face components. The process of the eyes and south may be included into the selection process by storing images having different sizes in the face component library 11.

Figure 16:
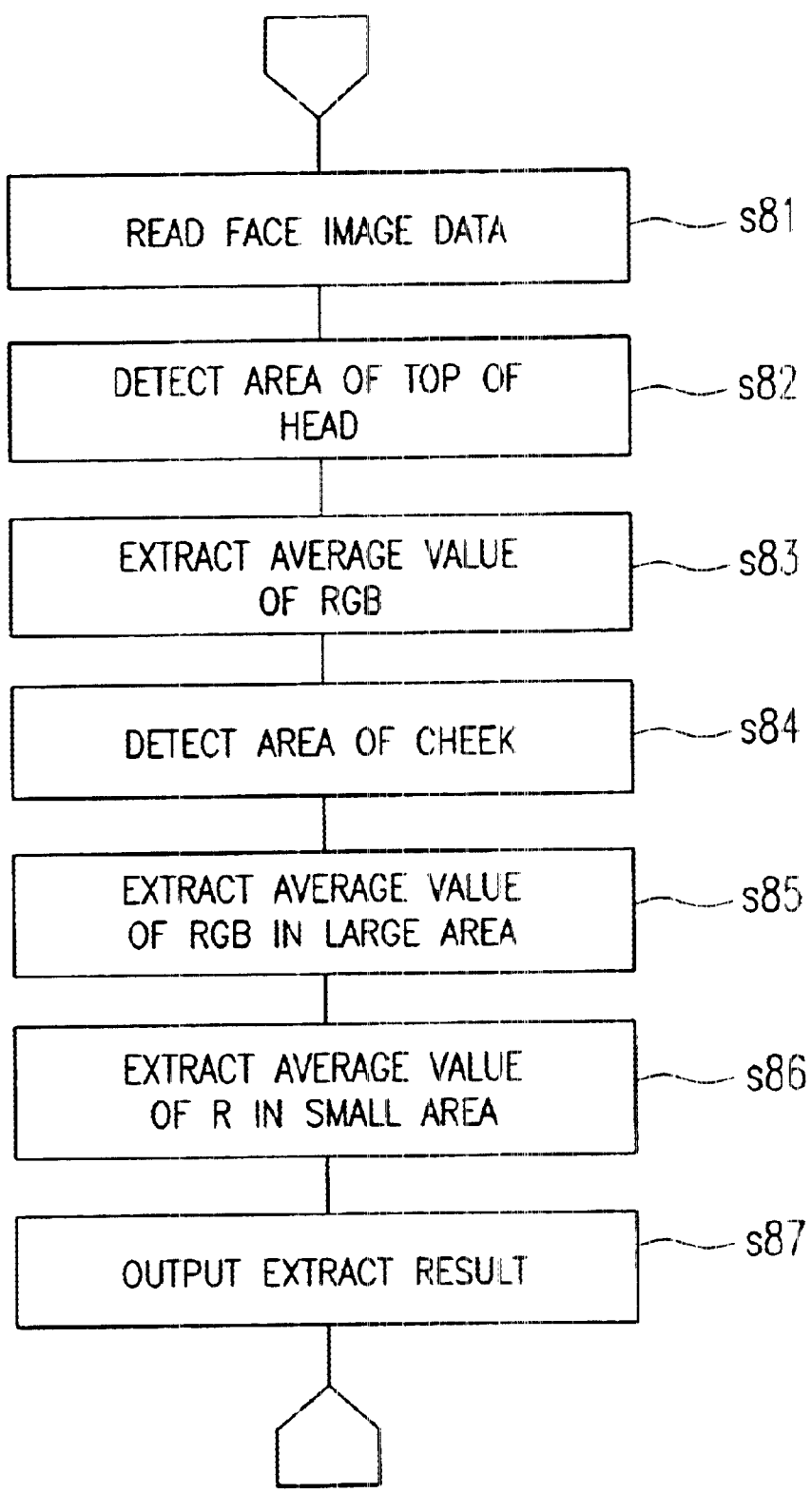
FIG. 16 is a flow chart for extracting a color in the image creating apparatus of FIG. 14.
Figure 17A:
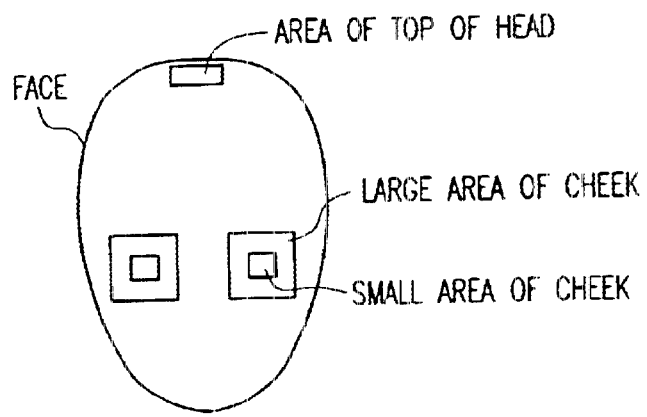
FIG. 17 illustrates a process for correcting a standard color and adding a cheek component in the image creating apparatus of FIG. 14.
Figure 17B:
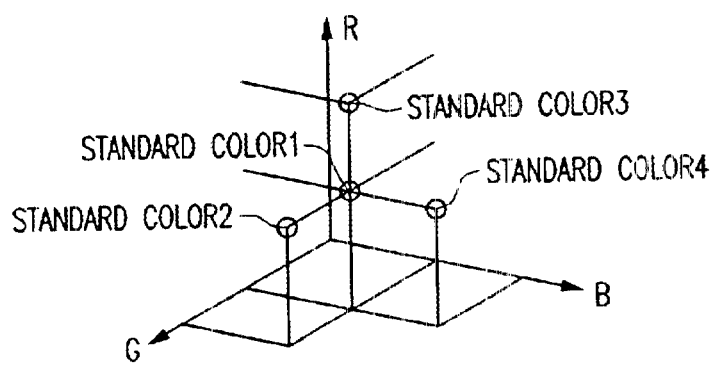
Figure 17C:
Figure 17D:
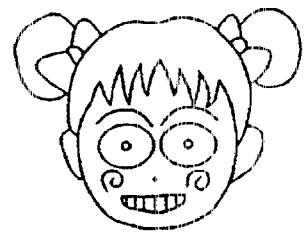
Figure 17E:
Figure 17F:

As shown in FIG. 16, the color extract device 23 in the extract process of the step s65 of FIG. 15 reads out face image data after its image process from the image input device 24 (a step s81), detects an area of a top of a head in the face image data (a step s82), finds an average value of each color of three primary colors of additive mixture RGB about pixels in the detected area (a step s83), detects large and small areas of a cheek in the entered face image data (see FIG. 17 at (A)) (a step s84), extracts an average value of each color of RGB about pixels included in the detected large area (a step s85), extracts an average value of an R color about pixels included in the detected small area of cheek (a step s86), and outputs the extracted average values of each color of RGB in the top area of the head and each color of RGB in the large area of the cheek and R color in the small area of the cheek to the color correct mean 24 of the control device 22 (a step s87).

In the correct process of the standard color in the step s69 of FIG. 15, the color correct means 24 compares the average value of each color of RGB in the top area of head and the large area of cheek entered by the color extract device 24 with a standard value of Japanese to modify a ratio of the standard color of hair or face contours about a color having a difference larger than a predetermined quantity from the standard value of Japanese in its comparison result. For instance, when the average value of R color in the top area of head entered by the color extract device 23 is higher than the standard value of Japanese the standard color added into the hair image chosen from the image library is corrected into more reddish color. As shown in FIG. 17 at (B), a plurality of standard colors about each of the hair and the face contours are so prepared that standard colors may be chosen to be the closest to the average values of each color of RGB in the top area of head and each color of RGB in the large area of cheek.

In the process of addition of the cheek component in the step s70, when the average value of R color included in the small area of cheek extracted from the entered color face image data is high in comparison with the average value of R color in the large area of cheek, viz. when a center of the cheek is redder in comparison with an outside of the cheek in the color face image data, red color cheek components having shapes shown in FIG. 17 at (C) are added into the cheeks of a portrait to create a portrait shown in FIG. 17 at (D). If desired, an ago of the entered color face image data may be received to change cheek component according to the age. For instance, the cheek components shown in FIG. 17 at (C) are added when the entered age is young and red color cheek components having a shape shown in FIG. 17 at (E) are added to create a portrait shown in FIG. 17 at (F) when the entered age is old. The positions, shapes and colors of the added components are not limited to the above.

Thus, the image creating apparatus 21 extracts colors of hair and cheeks from the entered color face image data, and corrects the standard colors which are added beforehand into the images of hair and face contours according to image classes based on the extracted colors to create a portrait colored by image classes including characteristics in colors of its real face.

Predetermined standard colors of other face components than the hair and face contours may be corrected according to colors extracted from color face image data.

Figure 18A:
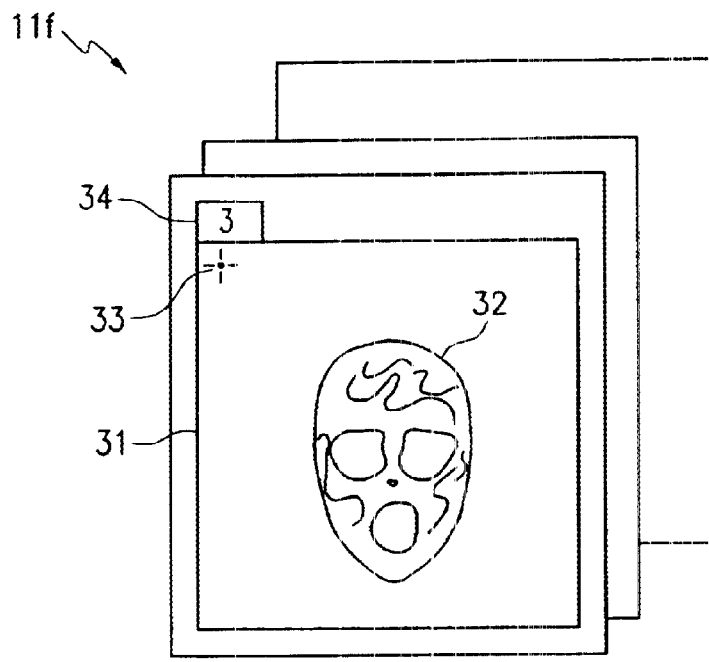
FIG. 18 shows a storage status about a contour image and a hair image in a face component library of an image creating apparatus as a fourth embodiment of this invention.
Figure 18B:
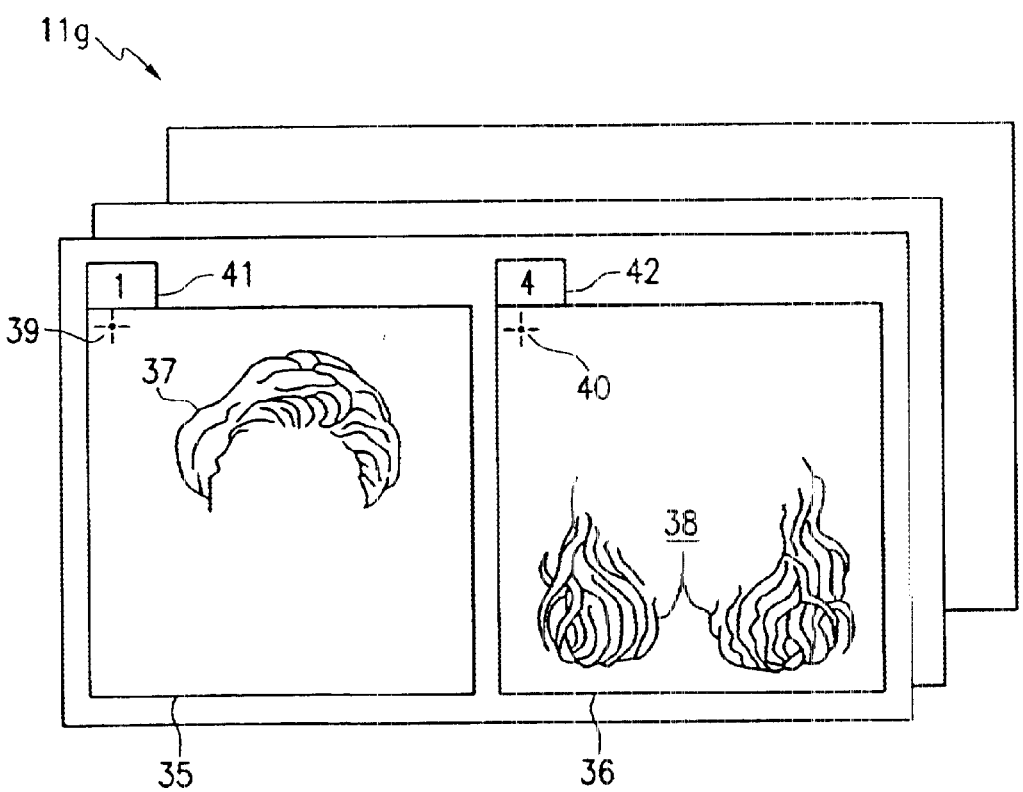

FIG. 18 shows a storage status about a contour image and a hair image in a face component library of an image creating apparatus as a fourth embodiment of this invention. The image creating apparatus employs the same block diagram as that of FIG. 9 including the image face component library 11 of FIG. 2 and the rule library FIG. 3. An operation of this apparatus has a same flow chart as that of FIG. 4 except that the composite face image composed in the step s12 is displayed in the image display device 13. Other component and explanation hereinafter.

Returning to FIG. 18, a storage in a part of the face component library 11 of this embodiment is shown in detail. The image library o the contours lit stores a plurality of contour image groups for each image class. One contour imaqes group is composed of a plurality of contour images. As shown in FIG. 18 at (A), each contour image is composed by arranging a contour image 32 of a face having a predetermined color at a predetermined position within an image frame 31 corresponding to a full screen of an image face. Image data of the predetermined color is written into pixels within the contour image 32 of the face in the image frame 31. Transparent image data is written into pixels of other portion than the face contour image 32 in the image frame 31. One of the pixels written by the transparent image data in the image frame 31 is shown at a reference point 33. The image frame 31 is provided with a layer number 34 of "3".

That is, the face images are composite images composed by a plurality of face component imaqes which are composed by a plurality of layers having different distances from a view point, and each layer i provided with an image frame with a size corresponding to a full screen of an image face. The respective layer& are provided with layer numbers "1, 2, 3 . . . " in order of the shortest distance from the view point. Thus, a face image i composited referring to a layer number assigned to each image frame 31. As described above; the layer number corresponds to distance information of this invention.

The hair image library 11g stores a plurality of hair image groups for each image class. One hair image group is composed of a plurality of hair images. Each hair image is divided into an image of front hair positioned in front of face contours and an image of back hair positioned behind the face contours for storage. As shown in FIG. 18 at (B), each hair image is composed by respectively arranging the front and back hair images 37 and 36 with a predetermined color at predetermined positions within a pair of image frames 35 and 36 corresponding to full screens of image faces. Thus, image data of the predetermined color is written into the pixels in the front hair image 37 and the back hair image 38 within the respective image frames 35 and 36. Image data of transparency is written into the pixels other than the front and back hair images 37 and 38 within the respective image frames 35 and 36. Reference points 39 and 40 are ones of pixels written by the transparent image data in the respective image frame 35 and 36, and are located at the are position as that of the reference point 33 of the image frame 31. The image frames 35 and 36 are respectively provided with a layer number 41 of "1" and a layer number 42 of "2".

Figure 19:
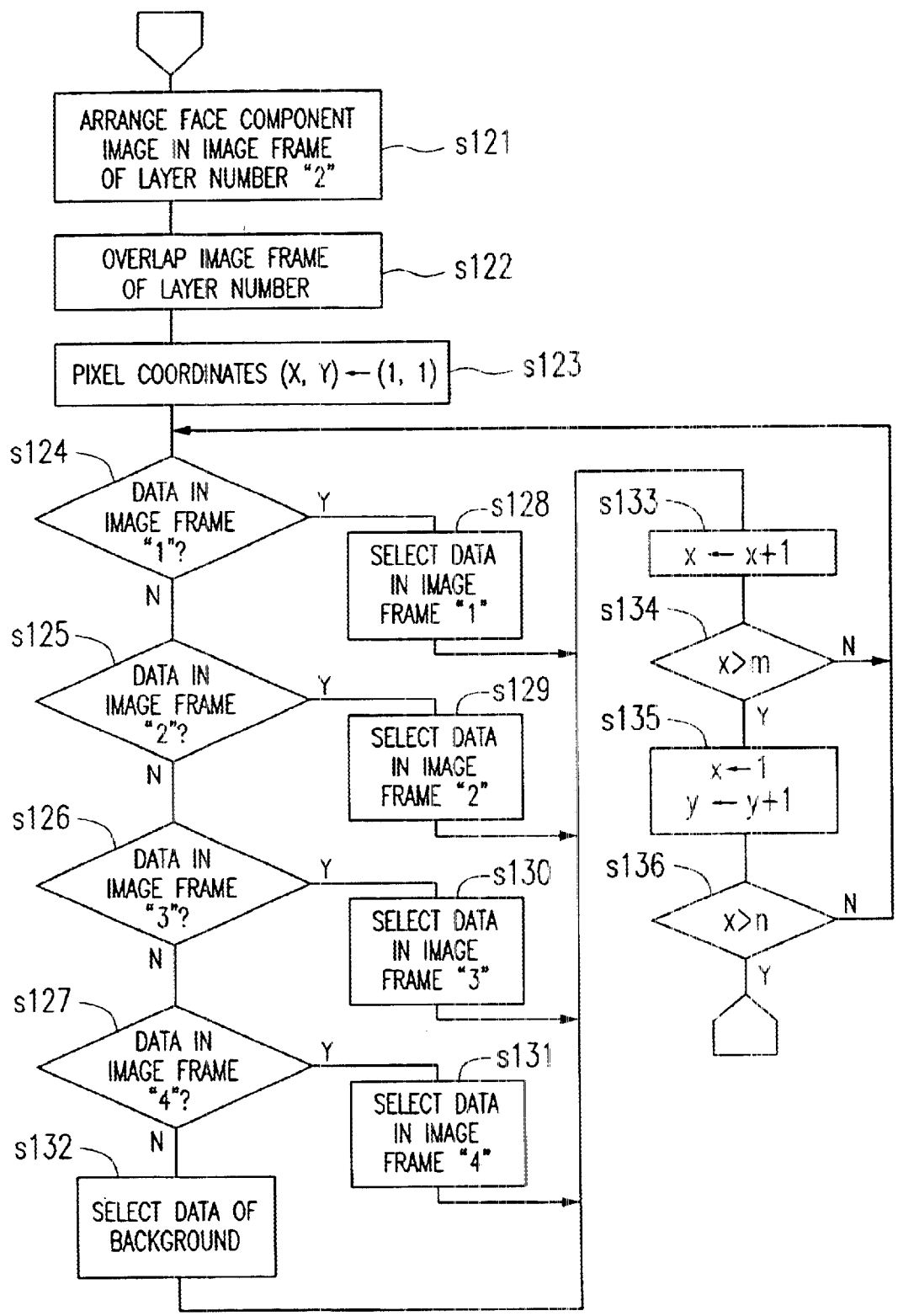
FIG. 19 is a flow chart of an image composite process in the image creating apparatus.
Figure 20A:
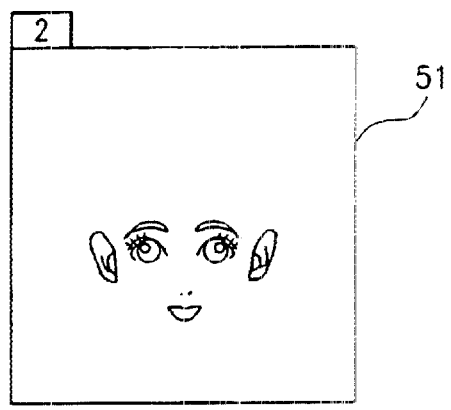
FIG. 20 is a status of a composite image in the image composite process of FIG. 19.
Figure 20B:
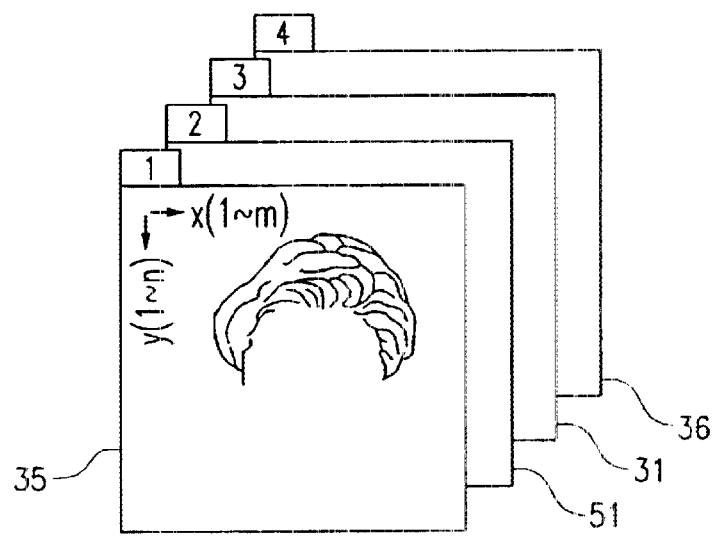
Figure 20C:
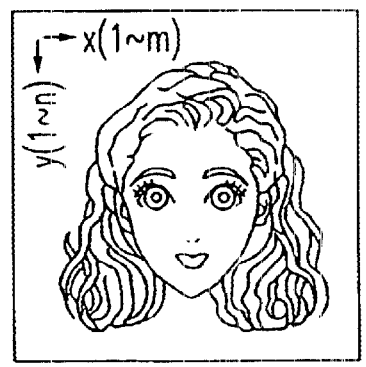
Figure 21A:
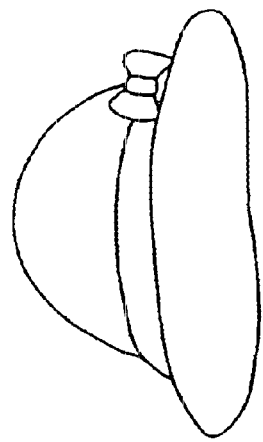
FIG. 21 is a status of a composite image in an image creating apparatus as a modification of FIG. 20.
Figure 21B:
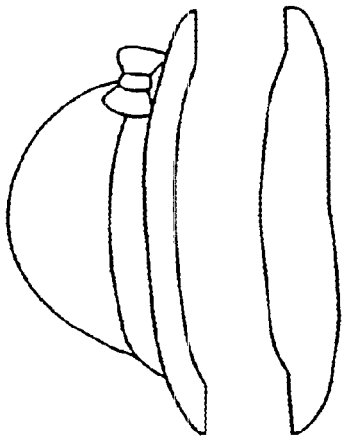
Figure 21C:
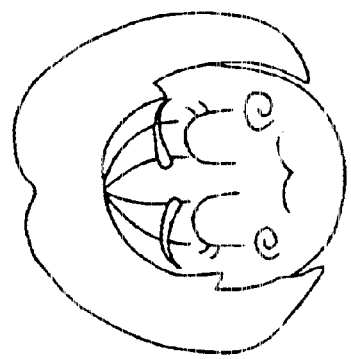
Figure 21D:
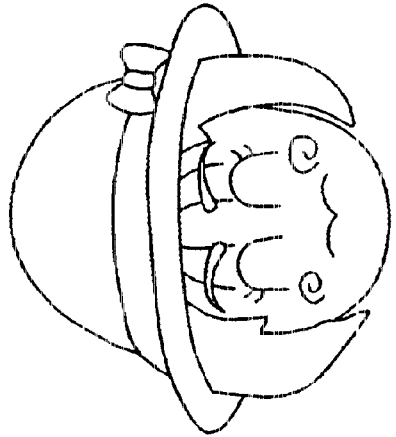

FIG. 19 is a flow chart of an image composite process in the image creating apparatus, which is details of the image composite process of FIG. 4. FIG. 20 shows a composite status of each composite image in the image composite process of FIG. 19. As shown in FIG. 20 at (A), the control device 2 arranges the images of eyes, a nose, a mouth and eyebrows, which are chosen in the step s6 of FIG. 4 and deformed in the step 58 of FIG. 4, at the arrange position determined in the step s10 of FIG. 4 within an image frame 51 provided with a layer number "2" (a step s121). Then, as shown in FIG. 20 at (B), the control device 2 piles up the image frame 51, the image frame 31 in which an image of contours chosen in the step s6 is arranged, and the image frames 35 and 36 in which the hair images are arranged by putting an image frame having a smaller number at an upper position wherein the positions of the pixels of the respective face components are adjusted by letting the reference points in the four image frames agreeing one after another (a step s122).

By agreeing the coordinate values of the respective pixels in each image frame. the positions of the images of the respective image frames may be adjusted by the coordinate values so that the reference points of the respective image frames can be omitted.

The control device 2 judges if image data of a color i assigned to each pixel in each image frame in order of a higher layer number (steps s123 to s127). A color of the image data with a higher layer number is determined as a color of the pixel (steps s126 to s131). When all image frames are not yet assigned by color image data a predetermined background color is determined as a color of the pixel (a step s132). The control device 2 executes the process from the step s124 to the step s132 about each pixel included in an image frame, viz., a full screen of an image face (steps s133 to s136), and creates a single of a face image as shown in FIG. 20 at (C).

According to the image creating apparatus of this embodiment, when the image of hair is composed of a front hair image to be positioned in front of the face contours and a back hair image to be positioned behind the face contours, the hair image representing one face component is divided into a pair of small component images of a front hair image and a back hair image to constitute a layer construction with the front and back hair images and the face contour image for storage, and the image data in the most upper layer is chosen about each pixel to composite a face image. Accordingly, irrelevant to any change of combination between the face contour image and the hair image to be composited, the hair image may be created in three-dimensions with positioning the front hair image in front of the face contours and the back hair image behind the face contours.

As the hair image to b composited to the same contour image is changed or the contour image to be composited to the same hair image is changed, an area of the race contours hidden by the front hair and an area of the back hair hidden by the face contour are changed. In this image creating apparatus, the front hair image, the face contour image and the back hair image are arranged in order from top to down and the image data of an image residing at upper position is chosen about each pixel, so that the image data of the Contour image in the area hidden by the front hair is avoided to be chosen as image data of a composite image. Therefore, the contour image or the hair image is properly deformed according to the forms of the composited hair image or contour image, whereby a plurality of images agreeing with the forms of the hair and contour images to be composited are not required to be prepared for the same contour and hair images.

When a hat is included as a component, a front portion of the hat is located in front of the hair, and a rear portion of the hat is located behind the hair. Accordingly, an area of the hat hidden by the hair image varies with the change of the hair image to be composited even if the hat is not changed. By contrast, an area of the hair image hidden by a front portion of the hat image varies with the change of the hat image to be composited even if the hair is not changed.

For instance, an image of a hat in FIG. 21 at (A) is divided into a pair of small components of front and back hat portion images, wherein an image frame including the front hat portion image is given a higher level number than a layer number of an image frame including the hair image and an image frame including the back hat portion image is given a lower level number than a layer number of the image frame including the hair image to be stored. By executing thus storage process and a same process as that of FIG. 19, the hat image shown in FIG. 21 at (A) and the face image shown in FIG. 21 at (C) are composited to create a composite portrait shown in FIG. 21 at (D).

When components of the composite image includes a background, a body part such as arms and other goods, layer numbers are assigned to images of the respective components and a same process as that of FIG. 19 is executed, whereby a composite portrait is easily created. Thus advantages may be expected in other composite image composed by a plurality components than the above-mentioned creation of a portrait based on data of a face.

While various particular features of the invention has been described, it will be apparent to those skilled in the art that modifications may be made without departing from the spirit and scope of the invention and it is, therefore, intended in the appended claims to cover all such changes and modification.

What is claimed is:

1. An image creating apparatus comprising:

an image input device for receiving input of image data;

a storage device storing a plurality of image component data each having a different character quantity in each of a plurality of image classifications which is provided with a different trend of character quantity;

a class select device for receiving a selection-input for one of said plurality of image classes; and a control device for selecting image component data from said storage device based on a character quantity of an image component extracted from the image data received by said image input device and the image class selected by said class select device to create an image.

2. An image creating apparatus according to claim 1 in which said storage device stores image component data including a select rule of an image component.

3. An image creating apparatus according to claim 1 in which said image data input device includes an image pickup device for taking an image.

4. An image creating apparatus according to claim 1 in which said storage device stores component data about a face to create a portrait based on face image data entered by said image input device.

5. An image creating apparatus according to claim 1 in which said storage device stores a plurality of image component data in each of a plurality of image classes classified by a type, an expression, an age and a sex.

6. An image creating apparatus according to claim 1 wherein said control device creates a plurality of images, and which includes an image display device for displaying the plurality of images created by said control device, an image select device for receiving a selection of one of the plurality of images displayed by said image display device, and an output device for producing an image selected by said image select device.

7. An image creating apparatus according to claim 6 in which said control device creates a first image and a single or a plurality of second images by selecting image component data from said storage device based on the character quantity of the image component extracted from the image data entered by said image data input device, an image class selected by said class select device and a single or a plurality of image classes not selected by said class select device, said image display device displays said second images in a standby process in each of said devices or in a process of said first image, and said image select device receives a selection whether or not the second images are produced.

8. An image creating apparatus according to claim 1 in which said image input device receives color image data, said storage device stores component image data of a plurality of components including standard color data of at least one image component, and said control device extracts a character quantity of a plurality of components including color of said at least one component from color image data entered by said image input device, reads out component image data from said storage device based on the extracted character quantity, and corrects a standard color of a corresponding component based on the extracted color to create the image.

9. An image creating apparatus according to claim 8 in which said control device extracts colors of a plurality of portions in at least one component of the entered color image data, and decides whether or not other component is selected as a result of comparison between the colors of the plurality of portions.

10. An image creating apparatus comprising:
a storage device for storing images of a plurality of components included in a single composite image with distance from a view point of a person observing said composite image to the respective images, images of a plurality of small components divided about one or all of the components according to a distance from the view point for each component;
an image composite device for executing a process for each pixel to select an image having the shortest distance from the view point in the images of a plurality of components or small components extracted from said storage device; and
a control device for selecting image component data from said storage device based on a character quantity of an image component extracted from the image data received by said image input device and the image class selected by said class select device to create an image.

11. An image creating apparatus according to claim 10 in which an image of a component placed in an area in a distance direction from the view point to the images of other component or other small component in said plurality of components is divided into images of a plurality of small components placed in front and back of the other component or the other small components.

12. An image creating apparatus according to claim 11 in which said composite image is a face image composed by a plurality of face components, and an image of hair is divided into images of small components placed in front and back of the face image.

13. An image creating method comprising the steps of:
receiving input of image data through an image input device;
storing in a storage device a plurality of image component data each having a different character quantity in each of a plurality of image classifications which is provided with a different trend of character quantity;
receiving a selection-input for one of said plurality of image classes through a class select device; and
selecting image component data from said storage device based on character quantity of an image component extracted from the image data received by said image input device and the image class selected by said class select device to create an image.

14. An image creating apparatus comprising:
an image input device for receiving input of image data;
a character quantity extraction device adapted to extract a character quantity of a face component from said image data;
a storage device adapted to store a plurality of image component data, each data of said plurality having a different character quantity in each of a plurality of image classes respectively, each of said image classes having a different trend of character quantity;
a class select device for receiving a selection input for one of said plurality of image classes; and
a control device for selecting image component data from said storage device based on said character quantity and said selected image class to create an image.

15. An image creating apparatus comprising:
an image input device for receiving input of image data;
a character quantity extraction device adapted to extract a character quantity of a face component from said image data wherein said character quantity comprises a quantity representing a measured value of eye slant;
a storage device adapted to store a plurality of image component data, each data of said plurality having a different character quantity in each of a plurality of image classes respectively, each of said image classes having a different trend of character quantity;
a class select device for receiving a selection-input for one of said plurality of image classes; and
a control device for selecting image component data from said storage device based on said character quantity and said selected image class to create an image.

16. An image creating apparatus comprising:
an image input device for receiving input of image data;
a character quantity extraction device adapted to extract a character quantity of a face component from said image data wherein said character quantity comprises a quantity representing a measured value of eye roundness;
a storage device adapted to store a plurality of image component data, each data of said plurality having a different character quantity in each of a plurality of image classes respectively, each of said image classes having a different trend of character quantity;
a class select device for receiving a selection-input for one of said plurality of image classes; and
a control device for selecting image component data from said storage device based on said character quantity and said selected image class to create an image.

17. An image creating apparatus comprising:
an image input device for receiving input of image data;
a character quantity extraction device adapted to extract a character quantity of a face component from said image data wherein said character quantity comprises a quantity representing a measured value of eye size;
a storage device adapted to store a plurality of image component data, each data of said plurality having a different character quantity in each of a plurality of image classes respectively, each of said image classes having a different trend of character quantity;
a class select device for receiving a selection-input for one of said plurality of image classes; and
a control device for selecting image component data from said storage device based on said character quantity and said selected image class to create an image.

* * * * *